United States Patent
Minato et al.

(10) Patent No.: US 9,041,883 B2
(45) Date of Patent: May 26, 2015

(54) COUNTER SUBSTRATE FOR LIQUID CRYSTAL DISPLAY AND LIQUID CRYSTAL DISPLAY DEVICE

(75) Inventors: Koichi Minato, Tokyo (JP); Kenzo Fukuyoshi, Tokyo (JP); Mie Shimizu, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 271 days.

(21) Appl. No.: 13/443,272

(22) Filed: Apr. 10, 2012

(65) Prior Publication Data

US 2013/0002974 A1 Jan. 3, 2013

(30) Foreign Application Priority Data

Jun. 29, 2011 (JP) ................................. 2011-144564

(51) Int. Cl.
| | |
|---|---|
| G02F 1/1335 | (2006.01) |
| G02B 5/20 | (2006.01) |
| G02F 1/139 | (2006.01) |
| G02F 1/1343 | (2006.01) |

(52) U.S. Cl.
CPC .......... *G02B 5/201* (2013.01); *G02F 1/133512* (2013.01); *G02F 1/1393* (2013.01); *G02F 2001/134345* (2013.01)

(58) Field of Classification Search
USPC ........................................................ 349/110
See application file for complete search history.

(56) References Cited

U.S. PATENT DOCUMENTS

| | | | |
|---|---|---|---|
| 6,630,971 B1* | 10/2003 | Woo et al. ...................... | 349/110 |
| 2003/0184698 A1* | 10/2003 | Ohta et al. ...................... | 349/139 |
| 2005/0140856 A1* | 6/2005 | Choi et al. ...................... | 349/110 |
| 2007/0115409 A1* | 5/2007 | Oka et al. ....................... | 349/113 |

FOREIGN PATENT DOCUMENTS

| | | |
|---|---|---|
| JP | 11-95235 | 4/1999 |
| JP | 2000-102038 | 4/2000 |
| JP | 2003-279945 | 10/2003 |
| JP | 2005-10721 | 1/2005 |
| JP | 2006-208530 | 8/2006 |
| JP | 2007-11254 | 1/2007 |
| JP | 3940725 | 4/2007 |
| JP | 4010564 | 9/2007 |
| JP | 4213226 | 11/2008 |
| JP | 2009-139947 | 6/2009 |

(Continued)

OTHER PUBLICATIONS

Japanese Office Action mailed Apr. 23, 2013 for corresponding Japanese Application No. 2011-144564.

*Primary Examiner* — Timothy L Rude

(57) ABSTRACT

A counter substrate for liquid crystal display includes a transparent substrate, a black matrix, and stripe transparent electrodes. The black matrix divides a plane surface of the transparent substrate into pixel or sub-pixel unit to form a light-shielded area and openings above the plane surface. The stripe transparent electrodes are formed into the pixel unit or the sub-pixel unit above the plane surface. The black matrix includes a frame pattern including two sides facing each other in parallel in the pixel or the sub-pixel unit, and a linear central pattern which is parallel to the two sides of the frame pattern and is formed at a midsection of the pixel or the sub-pixel unit. The transparent electrodes are each parallel to the two sides of the frame pattern and the central pattern and are located symmetrically to the central pattern.

21 Claims, 18 Drawing Sheets

(56) References Cited

FOREIGN PATENT DOCUMENTS

| | | |
|---|---|---|
| JP | 2009-150952 | 7/2009 |
| JP | 2010-15183 | 1/2010 |
| JP | 2010-210982 | 9/2010 |

\* cited by examiner

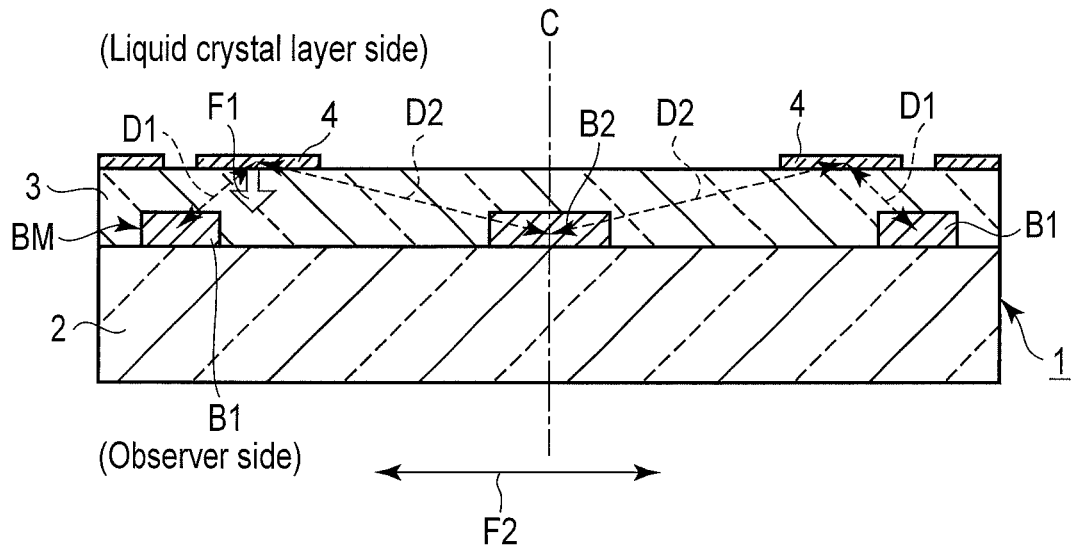
F I G. 1
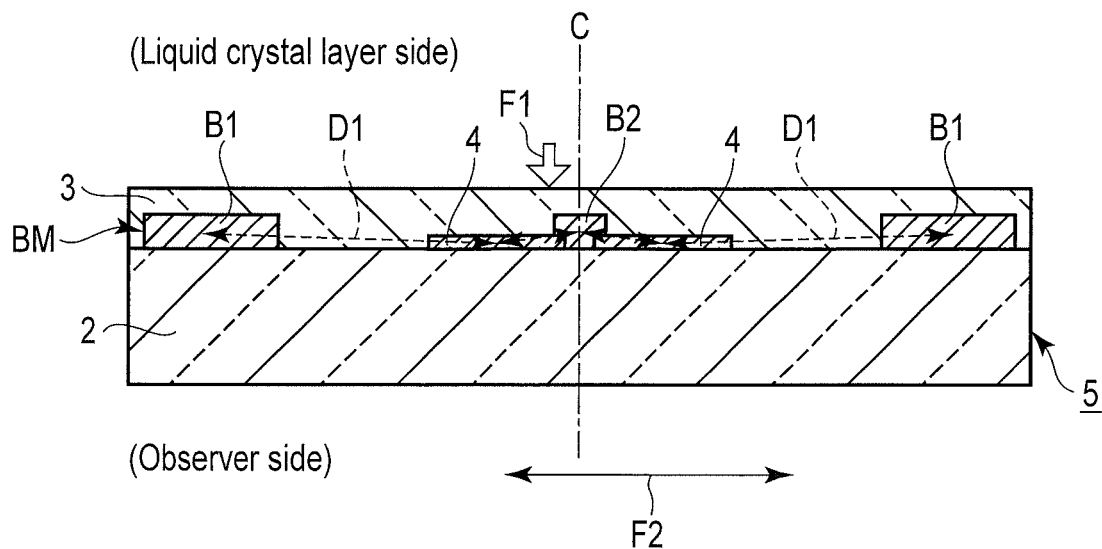
F I G. 2

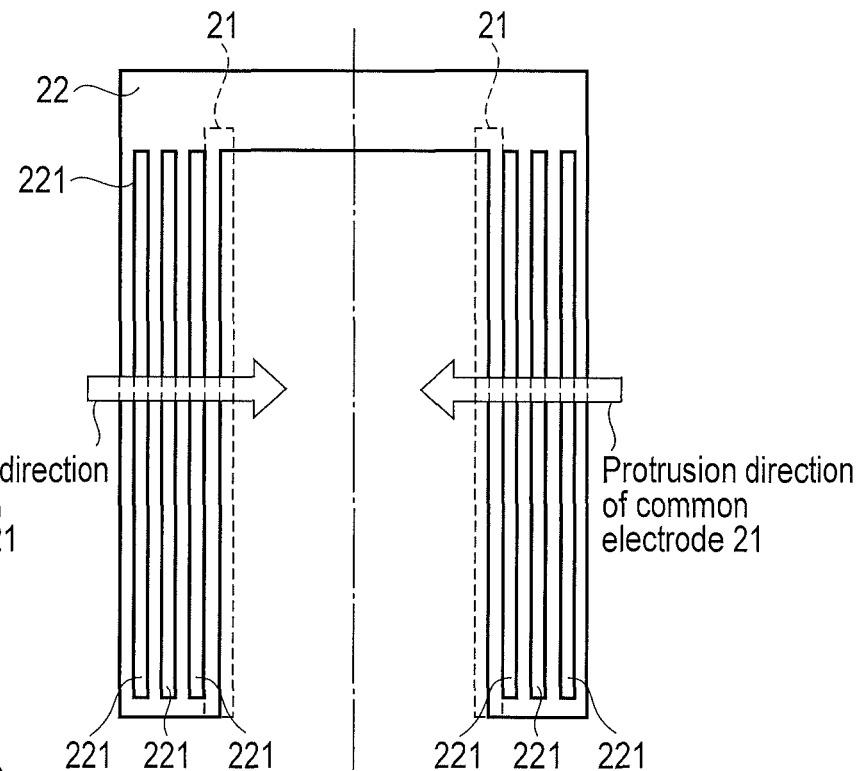
F I G. 16
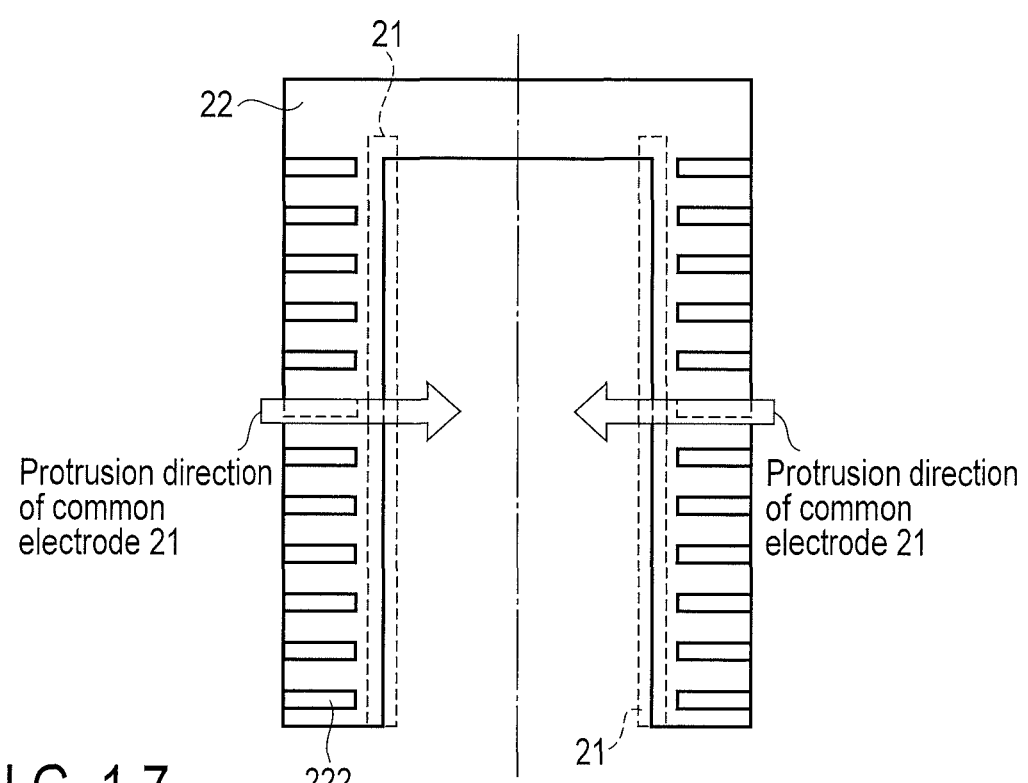
F I G. 17

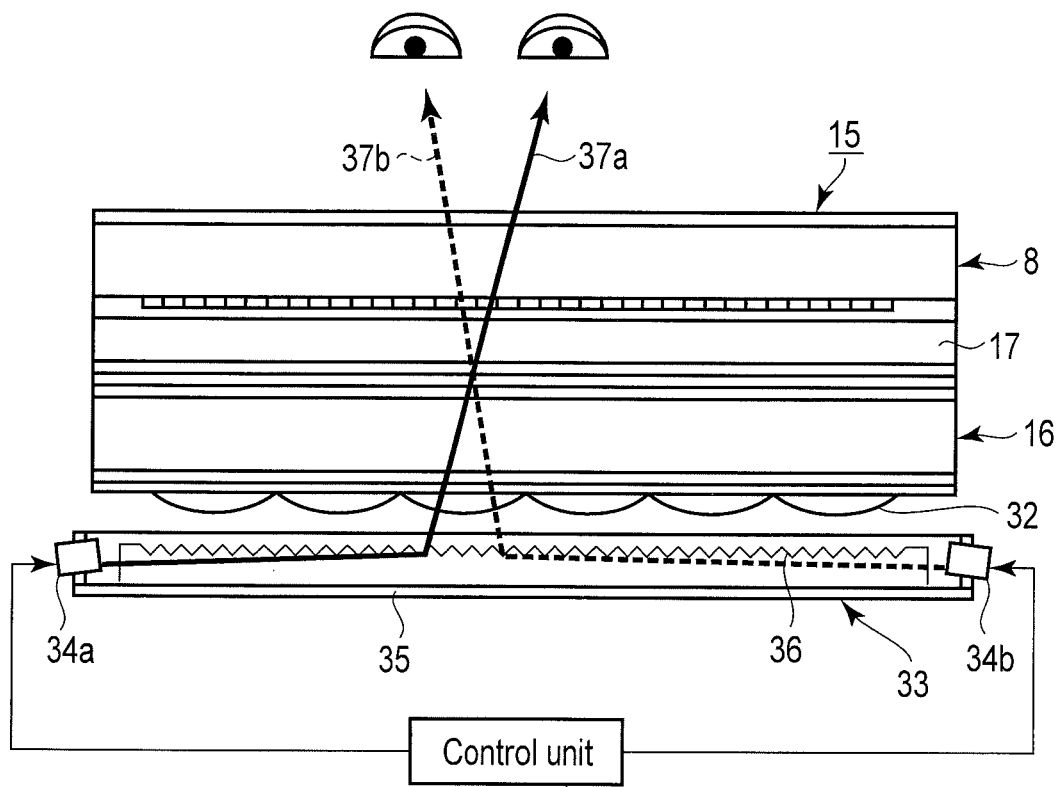
F I G. 20
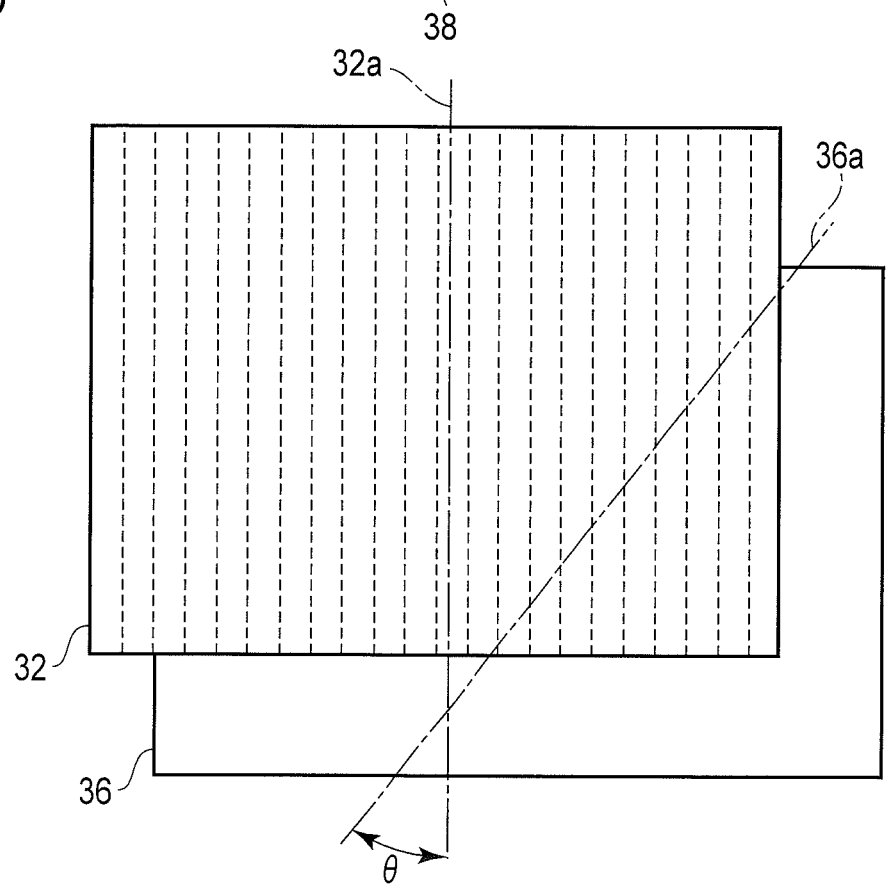
F I G. 21

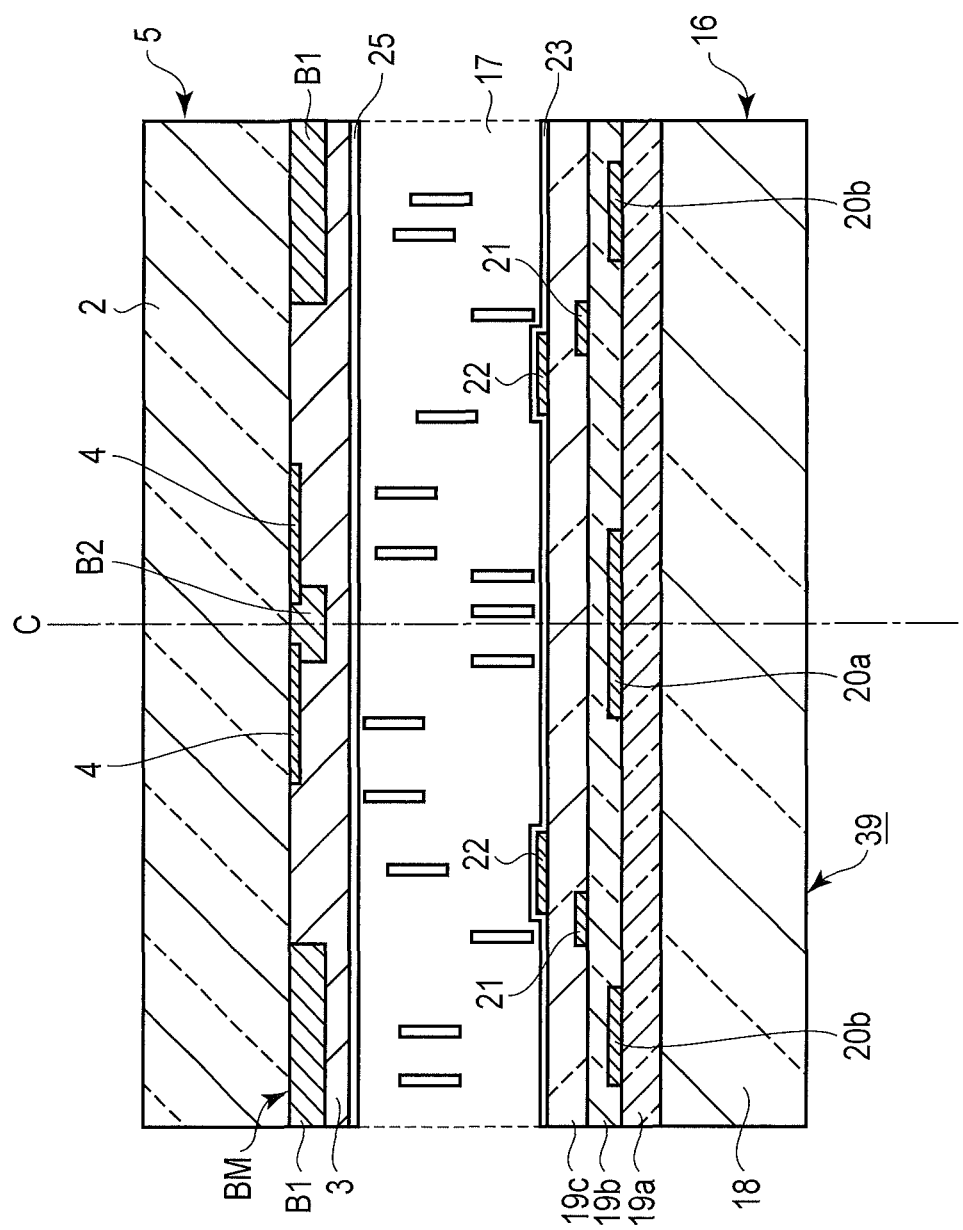
F I G. 22

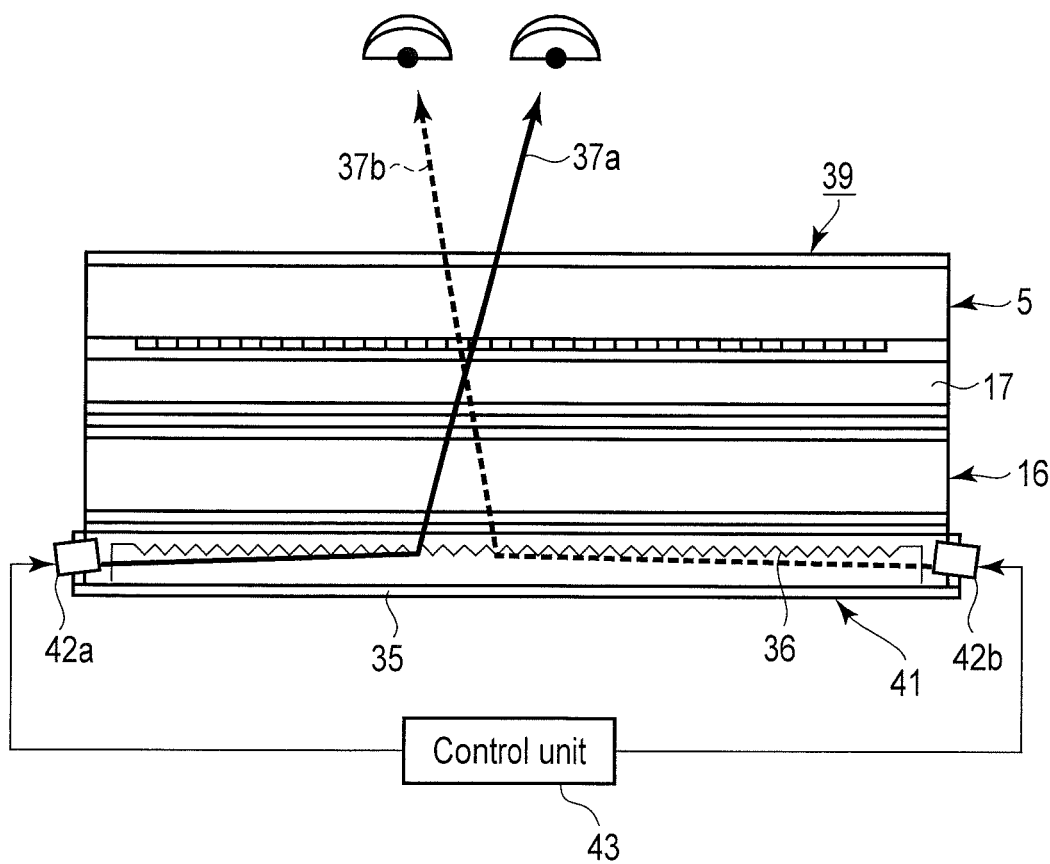
F I G. 24

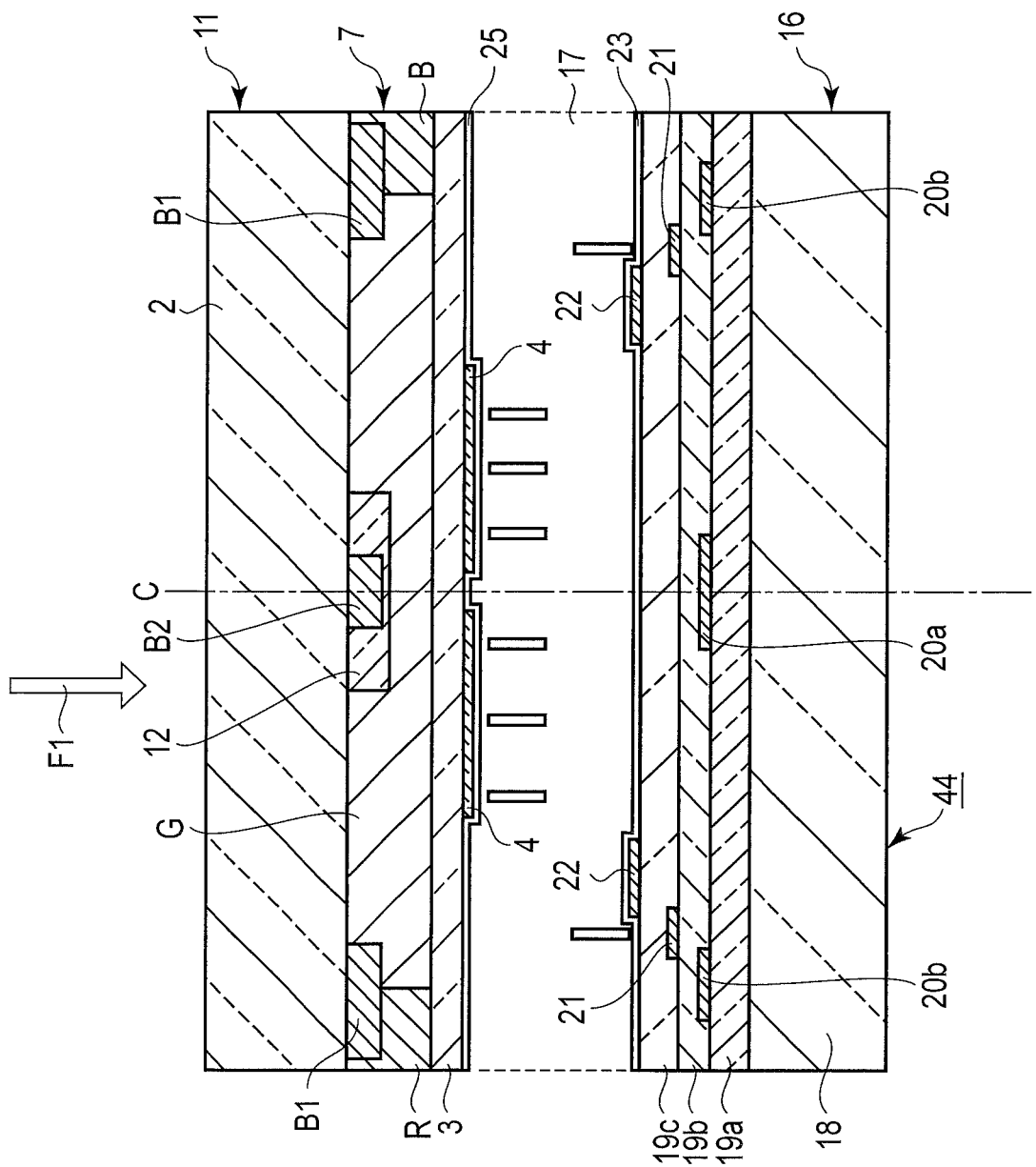
F I G. 25

COUNTER SUBSTRATE FOR LIQUID CRYSTAL DISPLAY AND LIQUID CRYSTAL DISPLAY DEVICE

CROSS-REFERENCE TO RELATED APPLICATIONS

This application is based upon and claims the benefit of priority from prior Japanese Patent Application No. 2011-144564, filed Jun. 29, 2011, the entire contents of which are incorporated herein by reference.

BACKGROUND OF THE INVENTION

1. Field of the Invention

The present invention relates to a counter substrate for liquid crystal display and a liquid crystal display device.

2. Description of the Related Art

A general liquid crystal display device includes a liquid crystal cell in which a liquid crystal layer is sandwiched by transparent substrates such as glass substrates. Additionally, the general liquid crystal display device includes a liquid crystal panel. In the liquid crystal panel, a polarizing plate and a retardation plate are provided above/on a surface and back surface of this liquid crystal cell. For example, a liquid crystal display device having a structure in which a back light is disposed as a light source at a back surface opposite to an observer, or a liquid crystal display device utilizing an external light source such as a room light in addition to a back light, is utilized. The liquid crystal display device utilizing the external light source includes the liquid crystal panel containing the polarizing plate and the like with the liquid crystal cell. In a three-dimensional liquid crystal display device (stereoscopic image liquid crystal display device) and a view angle controlling liquid crystal display device, the liquid crystal panel utilizing the back light or external light source controls an outgoing angle of an outgoing light from a surface of the liquid crystal panel according to a display purpose.

Various systems are known as the three-dimensional liquid crystal display device or three-dimensional display. These systems may include a system utilizing glasses and a system utilizing no glasses. A system utilizing specific glasses such as an anaglyph system utilizing a color difference or a polarized glasses system utilizing polarization of light may have troublesomeness because the observer have to wear glasses when the observer watches a three-dimensional image. Recently, a demand for a system which does not require wearing glasses is increasing.

In order to control the angle of the light from the liquid crystal panel surface and output the light to the single observer or multiple observers (hereinafter it may be referred to as "binocular" or "multiocular"), a technique of the liquid crystal display device including a light-controlling element for a surface or back surface of the liquid crystal panel, is used.

The light-controlling element used in the three-dimensional liquid crystal display device which does not require wearing glasses is generally divided into three systems.

A first system is a lenticular lens system which two-dimensionally arranging optical lenses to utilize regular refraction. The lenticular lens is formed from a transparent resin into a sheet, and is used by pasting it to a surface or back surface of the display device. Patent Document 1 (Japanese Patent No. 4010564) and Patent Document 2 (Japanese Patent No. 4213226) disclose three-dimensional image display techniques using a lenticular lens (lenticular screen).

A second system is a parallax barrier system which two-dimensionally arranges light-shielding slits, called as a parallax barrier, in one direction, and obtain outgoing lights for a right eye and a left eye by utilizing the arrangement. Patent Document 3 (Jpn. Pat. Appln. KOKAI Publication No. 2007-11254), Patent Document 4 (Jpn. Pat. Appln. KOKAI Publication No. 2009-139947) and Patent Document 5 (Jpn. Pat. Appln. KOKAI Publication No. 2010-210982) disclose the three-dimensional image display technique using the parallax barrier.

A third system is a flexible lens array system which controls the outgoing light concerned with a three-dimensional image using an optical element. In the optical element, index of refraction or phase axis is changeable by application of a voltage, or the like. For example, the optical element is a liquid crystal, a ferroelectric piezoelectric element, or the like. Patent Document 6 (Jpn. Pat. Appln. KOKAI Publication No. 2000-102038) and Patent Document 7 (Japanese Patent No. 3940725) disclose techniques using a liquid crystal lens array.

The parallax barrier system uses the light-shielding slits, and accordingly has a defect of decreasing light transmittance. In addition, according to the parallax barrier system, a non-display region which includes the light-shielding slits, interferes an observation by the observer, when the position of the observer is not appropriate, whereby an area in which the three-dimensional image cannot be observed may become wider.

In the lenticular lens system and the flexible lens array system, the defect of decreasing light transmittance occurring in the parallax barrier system is reduced. In the case of a cell phone or game machine including a compact liquid crystal panel used by the single observer (binocular), however, the liquid crystal panel tends to be thick and heavy in both of the systems.

In addition, the lenticular lens system shown in Patent Documents 1 and 2 described above employs a technique for collecting multiple units (unit pixels) and displaying by one lens for realizing the three-dimensional display function. The multiple units includes N units which are adjacent. N is more than 2. In a case of a full-color display, a unit (unit pixel) is generally composed of three color pixels of a red pixel, a green pixel and a blue pixel. Accordingly, a resolution of the liquid crystal display is greatly reduced, and further it is difficult to switch between the two-dimensional display (general display) and the three-dimensional display.

BRIEF SUMMARY OF THE INVENTION

In a first aspect, a counter substrate for liquid crystal display includes a transparent substrate, a black matrix, and multiple stripe transparent electrodes. The black matrix divides a plane surface of the transparent substrate into pixel units or sub-pixel units to form a light-shielded area and multiple openings above/on the plane surface. The multiple stripe transparent electrodes are formed into the pixel unit or the sub-pixel unit above/on the plane surface. The black matrix includes a frame pattern including two sides facing each other in parallel in the pixel unit or the sub-pixel unit, and a linear central pattern which is parallel to the two sides of the frame pattern and is formed at a midsection of the pixel unit or the sub-pixel unit. The multiple transparent electrodes are each parallel to the two sides of the frame pattern and the central pattern and are located symmetrically to the central pattern in a cross-section vertical to a longitudinal direction of the two sides of the frame pattern.

In a second aspect, a liquid crystal display device includes an array substrate comprising an active element, a counter substrate, and a liquid crystal layer. The array substrate and the counter substrate face each other with the liquid crystal layer. The array substrate includes a stripe-shaped or comb-teeth-shaped pixel electrode which is electrically connected to the active element for each pixel or sub-pixel located in a matrix state. The counter substrate includes a black matrix and multiple stripe transparent electrodes. The black matrix divides a plane surface of a transparent substrate into pixels units or sub-pixel units to form a light-shielded area and multiple openings above/on the plane surface. The multiple stripe transparent electrodes are formed into the pixel unit or the sub-pixel unit above/on the plane surface. The black matrix includes a frame pattern and a linear central pattern. The frame pattern includes two sides facing each other in parallel in the pixel unit or the sub-pixel unit. The linear central pattern is in parallel to the two sides of the frame pattern and formed at a midsection of the pixel unit or the sub-pixel unit. The multiple transparent electrodes are each parallel to the two sides of the frame pattern, the central pattern and the pixel electrode, and are located symmetrically to the central pattern in a cross-section vertical to the longitudinal direction of the two sides of the frame pattern, and shift from the pixel electrode in a horizontal direction of the cross-section.

BRIEF DESCRIPTION OF THE SEVERAL VIEWS OF THE DRAWING

FIG. 1 is a partial cross-sectional view showing a first example of a counter substrate for liquid crystal display according to a first embodiment;

FIG. 2 is a partial cross-sectional view showing a second example of a counter substrate for liquid crystal display according to the first embodiment;

FIG. 16 is a plane view showing a first example of flaw lines formed on a surface of a liquid crystal side of a pixel electrode;

FIG. 17 is a plane view showing a second example of flaw lines formed on the surface on the liquid crystal side of the pixel electrode;

FIG. 20 is a cross-sectional view showing an example of a liquid crystal display device according to a fourth embodiment;

FIG. 21 is a plane view showing an example of a relationship between an optical axis of a lenticular lens and an optical axis of a prism sheet;

FIG. 22 is a partial cross-sectional view showing an example of a liquid crystal display device according to a sixth embodiment;

FIG. 24 is a cross-sectional view showing an example of the liquid crystal display device including a back light according to the sixth embodiment;

FIG. 25 is a partial cross-sectional view showing an example of a liquid crystal display device according to a seventh embodiment.

DETAILED DESCRIPTION OF THE INVENTION

Figure 3:
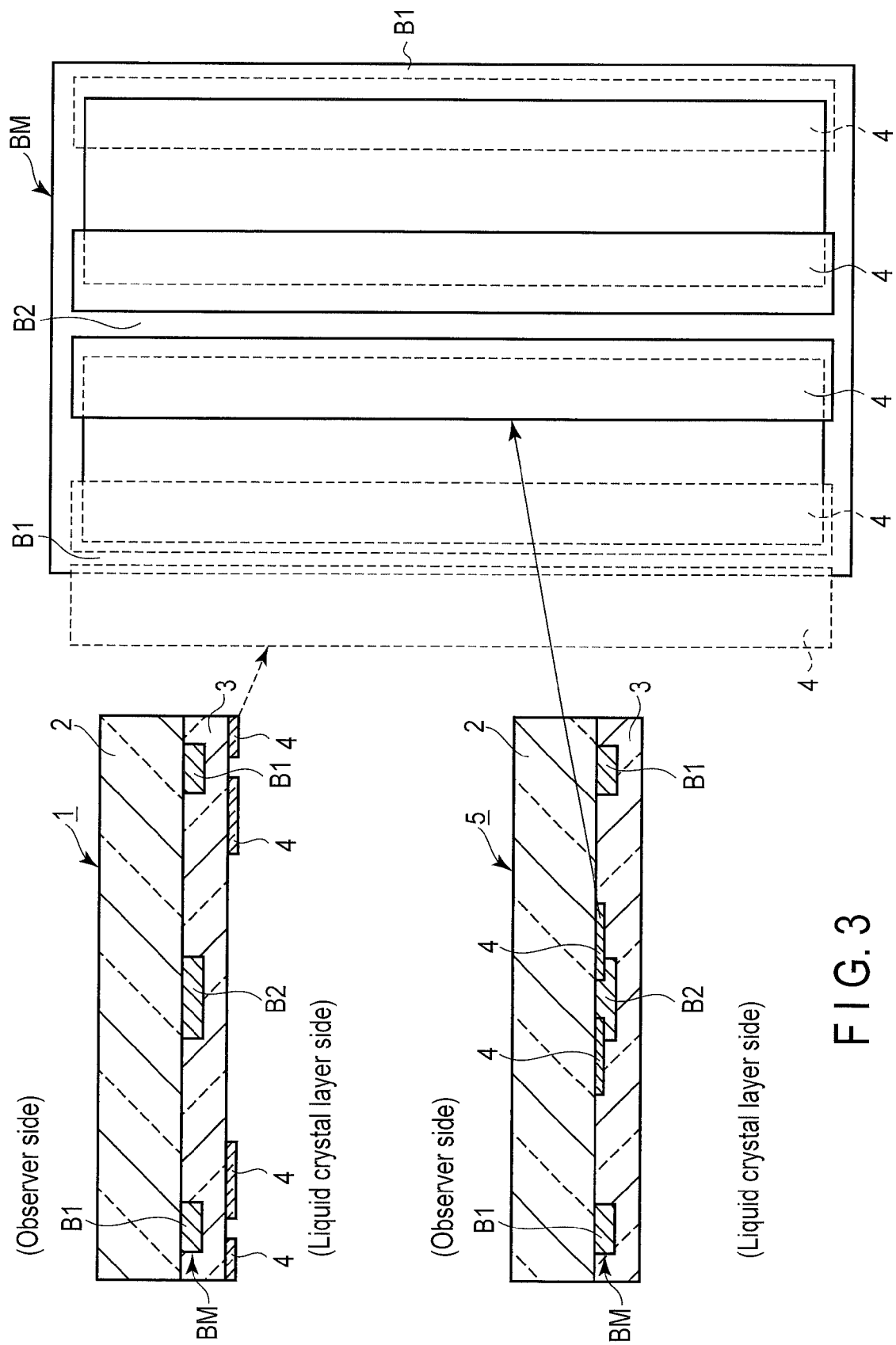
FIG. 3 is a plane view showing an example of a positional relation between a black matrix and a transparent electrode of the counter substrate according to the first embodiment.

Referring to the drawings, embodiments of the present invention will be explained below. In the following explanations, the same symbol is put to the same or substantially the same functions or constituent elements, and explanations are made if necessary.

In the following embodiments, only characteristic parts are explained, and explanations of parts differing little from usual constituent elements in a liquid crystal display device are omitted.

In the following embodiment, a unit of display of a single color in a liquid crystal display device is one sub-pixel or one pixel.

[First Embodiment]

In this embodiment, a counter substrate for liquid crystal display and a liquid crystal display device including this counter substrate will be explained. The counter substrate includes multiple stripe (band) transparent electrodes. The multiple stripe transparent electrodes are symmetrically located in a pixel or a sub-pixel unit.

FIG. 1 is a partial cross-sectional view showing a first example of a counter substrate for liquid crystal display according to this embodiment. FIG. 1 shows the cross-section of a pixel or a sub-pixel unit. FIG. 1 shows the cross-section vertical to a longitudinal direction of two sides (side lines) of a frame pattern of a black matrix.

A counter substrate 1 includes a transparent substrate 2, a black matrix BM, a transparent resin layer 3, and multiple transparent electrodes 4.

The black matrix BM is formed above/on one plane surface of the transparent substrate 2. The black matrix BM divides the plane surface of the transparent substrate 2 into a pixel or a sub-pixel unit. The black matrix BM forms a light-shielded area and multiple openings on the plane surface of the transparent substrate 2. The openings pass through a light.

The transparent resin layer 3 is formed above/on the plane surface of the transparent substrate 2 and the black matrix BM.

The multiple transparent electrodes 4 are located above/on the transparent substrate 2, and in this example of FIG. 1, the transparent electrodes 4 are formed on the transparent resin layer 3. The transparent electrode 4 has a slender shape, and is formed to the pixel unit or the sub-pixel unit.

In this embodiment, the black matrix BM includes a frame pattern B1. The frame pattern B1 includes two sides facing each other in parallel in the pixel unit or the sub-pixel unit. In addition, the black matrix BM includes a linear central pattern B2. The linear central pattern B2 is parallel to the two sides of the frame pattern B1, and formed at a midsection of the pixel unit or the sub-pixel unit.

Each transparent electrode 4 is parallel to the two sides of the frame pattern B1 and the central pattern B2. The transparent electrodes 4 are located symmetrically with respect to a central axis C passing through the central pattern B in the cross-section of FIG. 1 vertical to a longitudinal direction of the two sides of the frame pattern B1.

When this counter substrate 1 is provided in a liquid crystal display device, the counter substrate 1 is located so that another plane surface side of the transparent substrate 2 faces the observer (a surface side of a liquid crystal display device), and the transparent electrode 4 side faces a liquid crystal layer side.

In the cross-section of FIG. 1, a distance D1 between a center of the cross-section of the transparent electrode 4 and a center of the cross-section of the frame pattern B1 is shorter than the distance D2 between the center of the cross-section of the transparent electrode 4 and a center of the cross-section of the central pattern B2.

The multiple transparent electrodes 4 and the two sides of the frame pattern B1 are adjacent at a position in a horizontal direction F2 of the cross-section of the transparent substrate 2. Parts of the multiple transparent electrodes 4 are overlapped with parts of the two sides of the frame pattern B1 in a vertical direction F1.

FIG. 2 is a partial cross-sectional view showing a second example of a counter substrate for liquid crystal display according to this embodiment. FIG. 2 is illustrated based on the same conditions as in FIG. 1 described above.

In a counter substrate 5 of FIG. 2, a black matrix BM and stripe transparent electrodes 4 are formed above/on one plane surface of the transparent substrate 2.

The transparent resin layer 3 is formed so that the transparent resin layer 3 covers the one plane surface of the transparent substrate 2, the black matrix BM, and the multiple transparent electrodes 4.

In the cross-section of the counter substrate 5 of FIG. 2, the distance D1 between the center of the cross-section of the multiple transparent electrodes 4 and the center of the cross-section of the two sides of the frame pattern B1 is longer than the distance between the center of the cross-section of the multiple transparent electrodes 4 and the center of the cross-section of the central pattern B2. In this counter substrate 5, the central pattern B2 is put between the multiple transparent electrodes 4, and the transparent electrodes 4 is in contact with the central pattern B2.

The multiple transparent electrodes 4 and the central pattern B2 are adjacent at a position in a horizontal direction of the cross-section of the transparent substrate 2.

FIG. 3 is a plane view showing an example of a positional relation between the black matrix BM and the transparent electrode 4 according to this embodiment. FIG. 3 illustrates the positional relation between the black matrix BM and the transparent electrode 4 observed from an observer side.

In a counter substrate 1, the frame pattern B1 of the black matrix BM and the transparent electrode 4 are adjacent in a planar view.

In the counter substrate 5, the central pattern B2 of the black matrix BM and the transparent electrode 4 are adjacent in a planar view.

Figure 4:
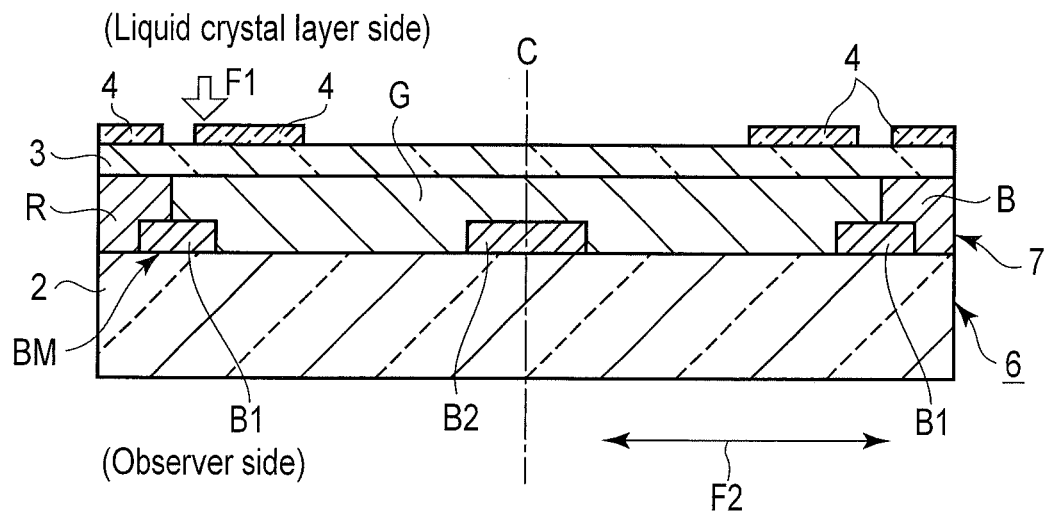
FIG. 4 is a partial cross-sectional view showing a third example of a counter substrate for liquid crystal display according to the first embodiment.

FIG. 4 is a partial cross-sectional view showing a third example of a counter substrate for liquid crystal display according to this embodiment. FIG. 4 is illustrated based on the same conditions as in FIG. 1 described above.

In a counter substrate 6 in FIG. 4, a color layer 7 is provided between the plane surface of the transparent substrate 2 on which the black matrixes BM are formed, and the transparent resin layer 3.

In other words, in the counter substrate 6, the color layer 7 is formed above/on the plane surface of the transparent substrate 2 and the black matrix BM. The color layer 7 includes at least two color filters of a red filter R, a green filter G and a blue filter B. In this counter substrate 6, any of the red filter R, the green filter G, and the blue filter B is provided to the pixel or the sub-pixel.

The transparent resin layer 3 is formed above/on the color layer 7.

Multiple transparent electrodes 4 are formed above/on the transparent resin layer 3.

In the cross-section of FIG. 4, a distance between the center of the cross-section of the transparent electrode 4 and the center of the cross-section of the frame pattern B1 is shorter than the distance between the center of the cross-section of the transparent electrode 4 and the center of the cross-section of the central pattern. The multiple transparent electrodes 4 and the two sides of the frame pattern B1 are adjacent at a position of the horizontal direction F2 of the transparent substrate 2. The parts of the multiple transparent electrodes 4 are overlapped with the parts of the two side of the frame pattern B1 in the vertical direction F1.

Figure 5:
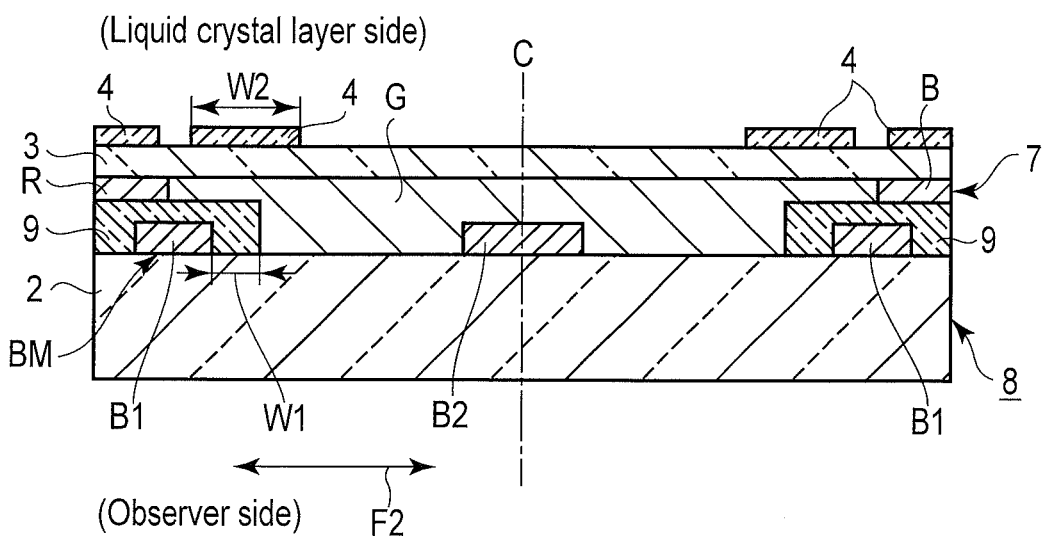
FIG. 5 is a partial cross-sectional view showing a fourth example of a counter substrate for liquid crystal display according to the first embodiment.

FIG. 5 is a partial cross-sectional view showing a fourth example of a counter substrate for liquid crystal display according to this embodiment. FIG. 5 is illustrated based on the same conditions as in FIG. 4 described above.

A counter substrate 8 in FIG. 5 includes a transparent pattern 9 and a structure of the counter substrate 6 in FIG. 4 shown above.

The transparent pattern 9 is formed between the two sides of the frame pattern B1 and the color layer 7.

A width W1 of the transparent pattern 9 between the two sides of the frame pattern B1 and the color layer 7 is smaller than a width W2 of the transparent electrode 4, in a horizontal direction (an opening width direction of the pixel or the sub-pixel) F2 of the cross-section of FIG. 5.

Figure 6:
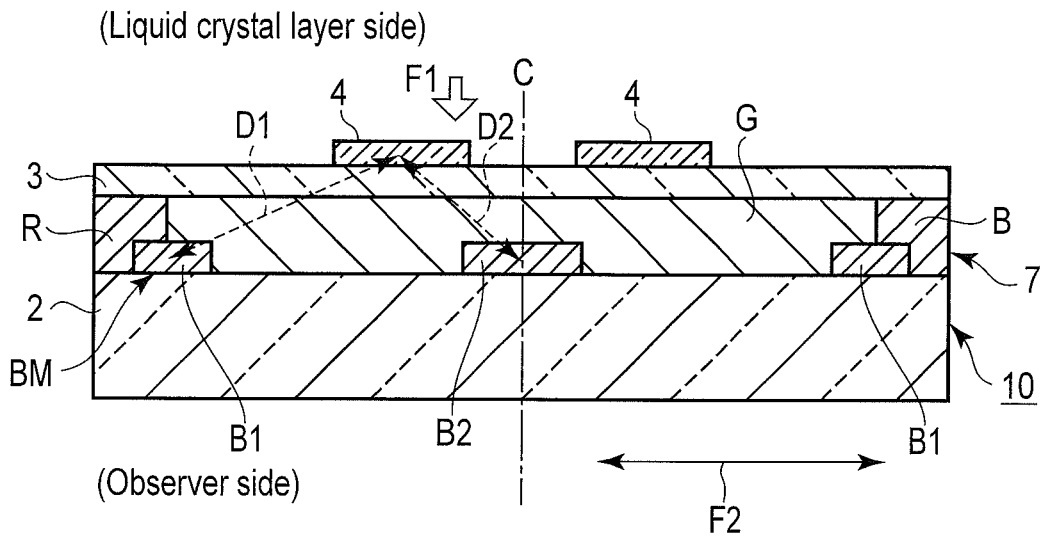
FIG. 6 is a partial cross-sectional view showing a fifth example of a counter substrate for liquid crystal display according to the first embodiment.

FIG. 6 is a partial cross-sectional view showing a fifth example of a counter substrate for liquid crystal display according to this embodiment. FIG. 6 is illustrated based on the same conditions as in FIG. 4 described above.

A counter substrate 10 of FIG. 6 is different in positions of transparent electrodes 4 from the counter substrate 6 in FIG. 4, and other components of the counter substrate 10 are the same as in FIG. 4.

The distance D1 between the center of the cross-section of the multiple transparent electrode 4 and the center of the cross-section of the two sides of a frame pattern B1 is longer than the distance D2 between the center of the cross-section of the multiple transparent electrodes 4 and the center of the cross-section of the central pattern B2 in the cross-section of the counter substrate 10. The multiple transparent electrodes 4 and the central pattern B2 are adjacent at a position in a horizontal direction F2 of the cross-section of the transparent substrate 2. The parts of the multiple transparent electrodes 4 are overlapped with the part of the center pattern B2 in the vertical direction F1.

Figure 7:
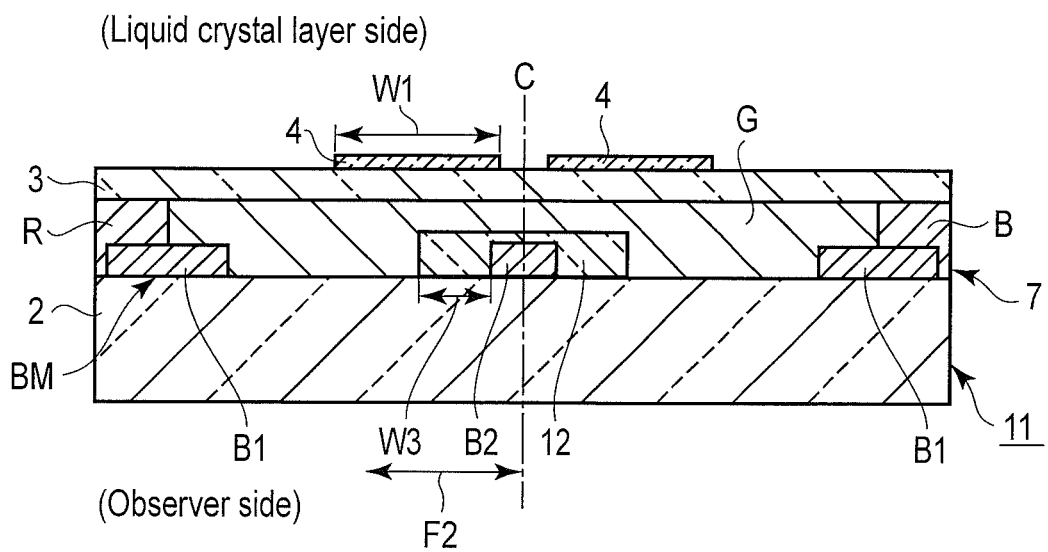
FIG. 7 is a partial cross-sectional view showing a sixth example of a counter substrate for liquid crystal display according to the first embodiment.

FIG. 7 is a partial cross-sectional view showing a sixth example of a counter substrate for liquid crystal display according to this embodiment. FIG. 7 is illustrated based on the same conditions as in FIG. 6 described above.

A counter substrate 11 of FIG. 7 includes a transparent pattern 12 and a structure of FIG. 5 illustrated above.

The transparent pattern 12 is formed between the central pattern B2 and the color layer 7.

A width W3 of the transparent pattern 12 between the central pattern B2 and the color layer 7 is smaller than a width W2 of the transparent electrode 4 in the horizontal direction F2 of a cross-section of FIG. 7.

Figure 8:
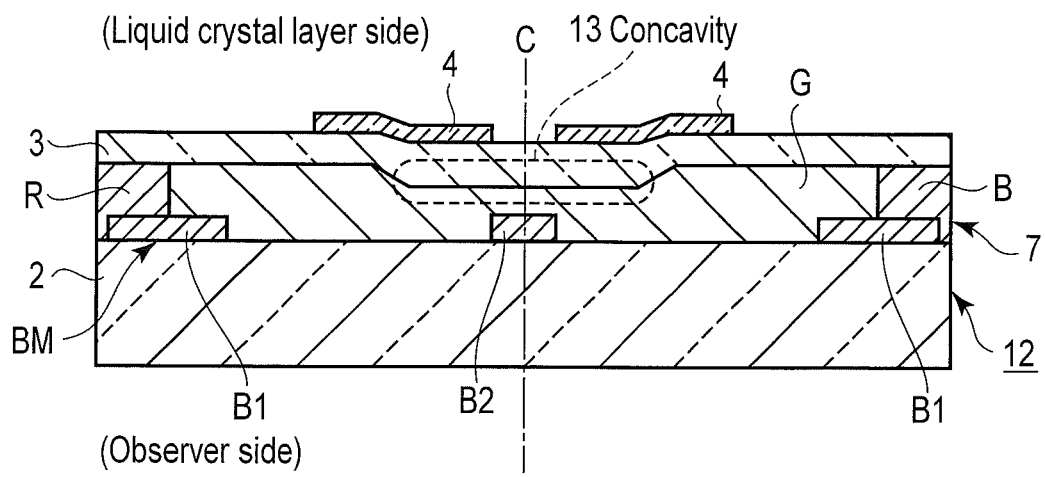
FIG. 8 is a partial cross-sectional view showing a seventh example of a counter substrate for liquid crystal display according to the first embodiment.

FIG. 8 is a partial cross-sectional view showing a seventh example of a counter substrate for liquid crystal display according to this embodiment. FIG. 8 is illustrated based on the same conditions as in FIG. 6 described above.

In a counter substrate 12, a concavity 13 is formed at a color layer 7 of the counter substrate 10 in FIG. 6 illustrated above. The concavity 13 is formed at a midsection of a surface opposite to a surface contacting with a central pattern B2 of a color layer.

A plane shape of a pixel or a sub-pixel will be explained below.

A pixel or a sub-pixel is a polygon having sides facing parallel to each other in a planar view. Specifically, the pixel or the sub-pixel can be formed into a plane shape of a square, a rectangle, a parallelogram or a "<"-shaped bending shape (V-shaped or boomerang-shaped).

Figure 9:
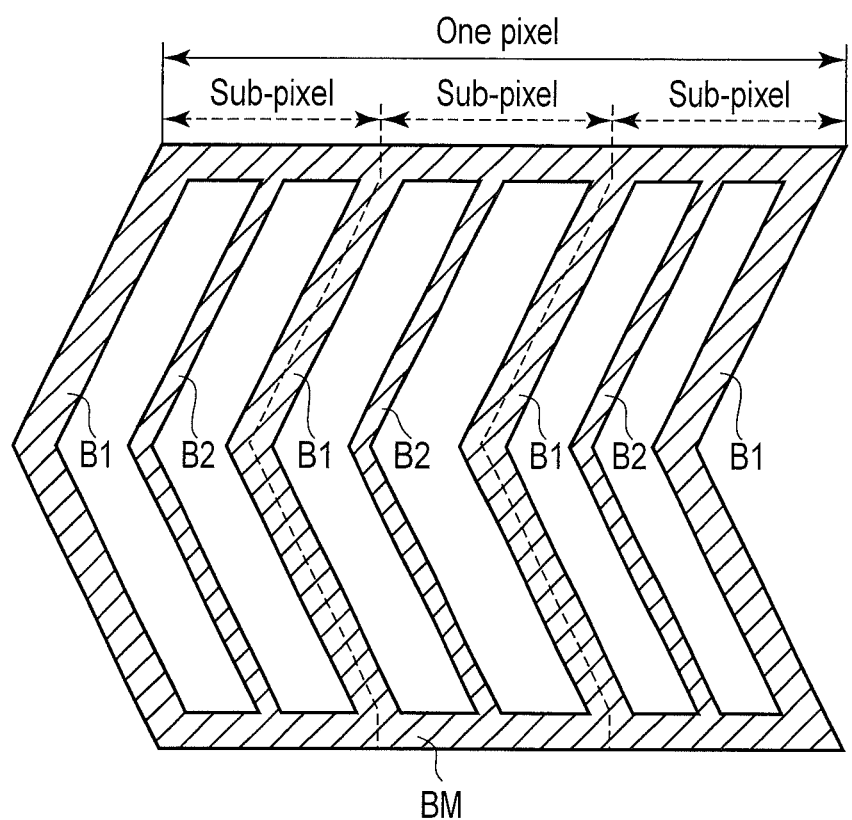
FIG. 9 is a partial plane view showing an example of an arrangement of "<"-shaped sub-pixels.

FIG. 9 is a partial plane view showing an example of an arrangement of "<"-shaped sub-pixels. In FIG. 9, multiple sub-pixels are arranged in a horizontal direction to form a one pixel.

Figure 10:
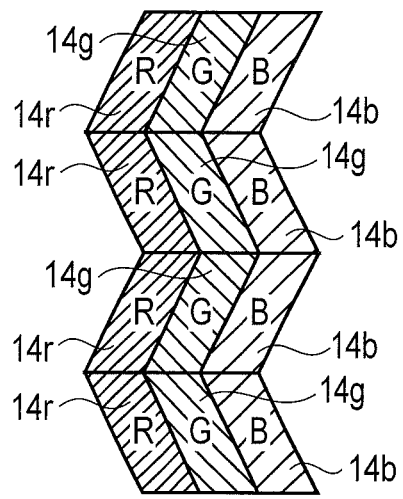
FIG. 10 is a partial plane view showing a first example of an arrangement of parallelogram sub-pixels.

FIG. 10 is a partial plane view showing a first example of an arrangement of parallelogram sub-pixels. In FIG. 10, sub-pixels 14r, 14g and 14b of different colors are arranged in a horizontal direction. The sub-pixels of same colors are arranged in a vertical direction. In FIG. 10, the central pattern B2 of the black matrix BM located at the center of the sub-pixel is omitted.

Figure 11:
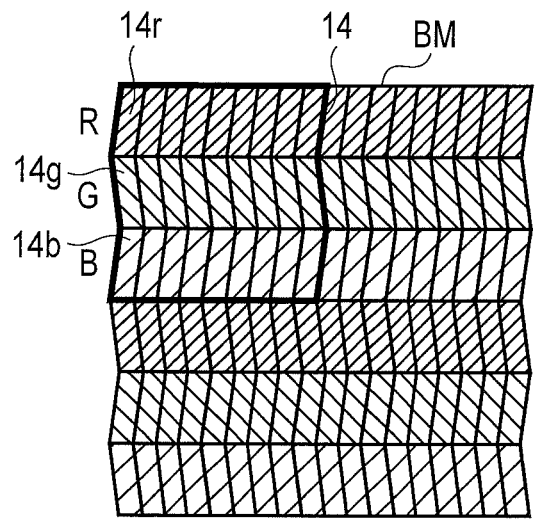
FIG. 11 is a partial plane view showing a second example of an arrangement of parallelogram sub-pixels.

FIG. 11 is a partial plane view showing a second example of an arrangement of parallelogram sub-pixels. In FIG. 11, the sub-pixels of same colors are arranged in the horizontal direction. The sub-pixels 14r, 14g and 14b of different colors are arranged in the vertical direction. A pixel 14 is formed by a set of 14r, 14g and 14b arranged in the vertical direction, and multiple sub-pixels 14r, 14g and 14b arranged in the horizontal direction.

Figure 12:
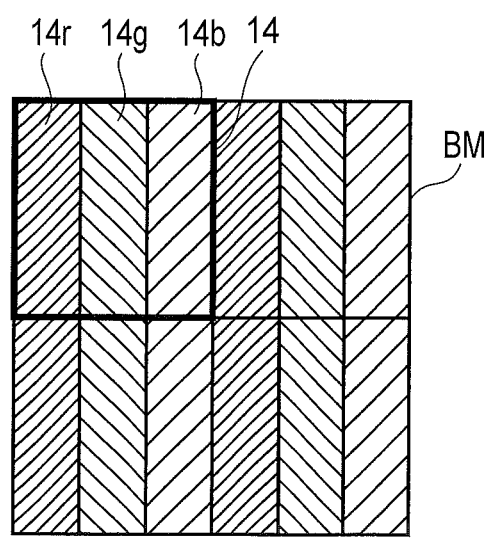
FIG. 12 is a partial cross-sectional view showing an example of a pixel formed from rectangle sub-pixels.

FIG. 12 is a partial cross-sectional view showing an example of a pixel formed from rectangle sub-pixels 14r, 14g and 14b. In FIG. 12, the sub-pixels 14r, 14g and 14b of different colors are arranged in the horizontal direction. The sub-pixels of same colors are arranged in the vertical direction. The pixel 14 is formed by a set of 14r, 14g and 14b arranged in the horizontal direction.

Specific examples of the liquid crystal display devices according to this embodiment will be explained below.

Figure 13:
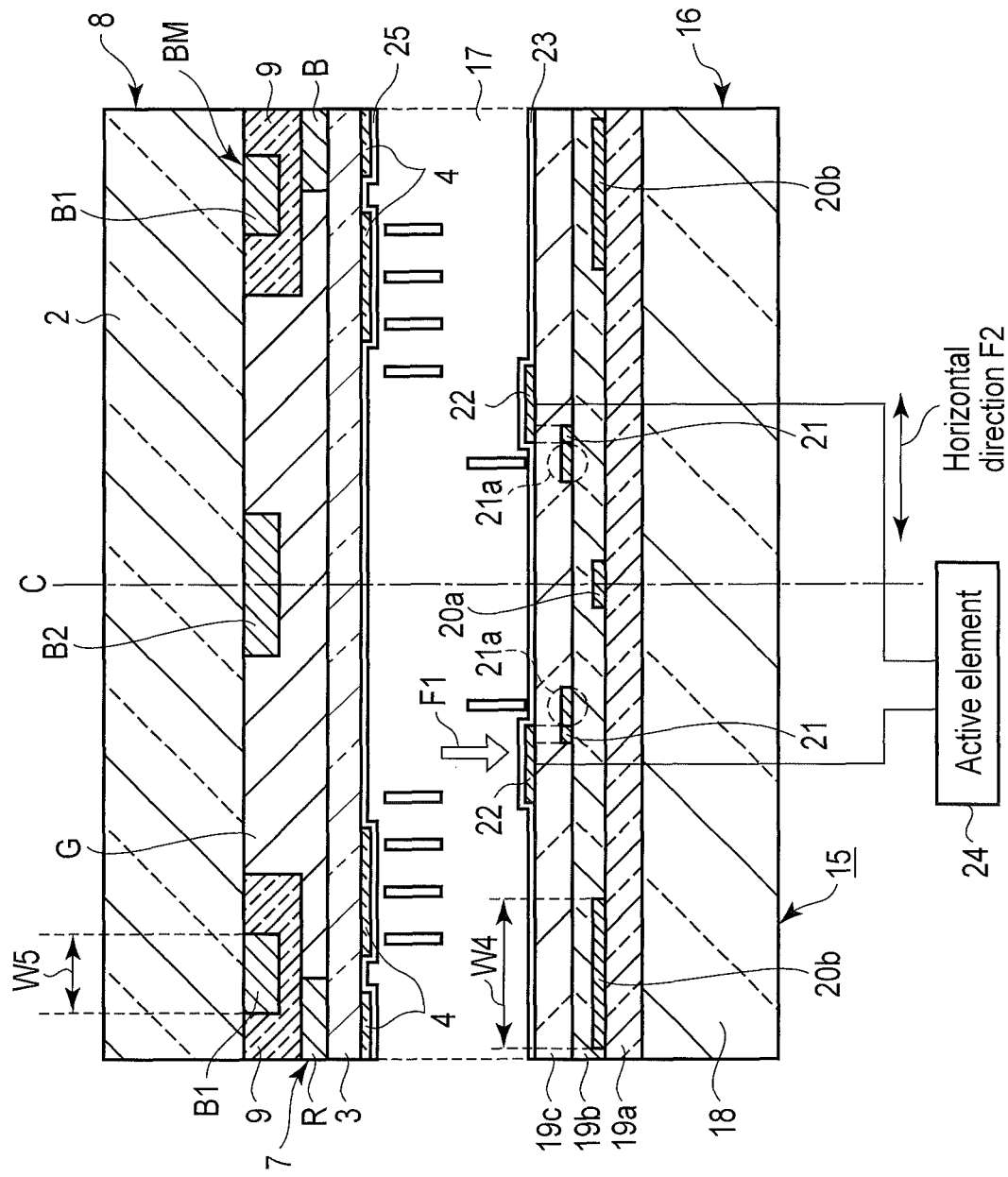
FIG. 13 is a partial cross-sectional view showing an example of a liquid crystal display device according to the first embodiment.

FIG. 13 is a partial cross-sectional view showing an example of a liquid crystal display device according to this embodiment. FIG. 13 shows a cross-section of a pixel or a sub-pixel unit. FIG. 13 is a cross-section which is vertical to a longitudinal direction of the two sides (sidelines) of the frame pattern B1 of the black matrix BM.

A liquid crystal display device 15 includes an array substrate 16, a liquid crystal layer 17, and a counter substrate 8. The array substrate 16 and the counter substrate 8 face each other through the liquid crystal layer 17.

The array substrate 16 includes an active element 24, a transparent substrate 18, insulating layers 19a to 19c, light-shielding patterns 20a and 20b, common electrodes 21, and pixel electrodes 22. A formed side of the pixel electrodes 22 of the array substrate 16 faces the liquid crystal layer 17.

The active element 24 is, for example, an oxide semiconductor thin-film transistor using a complex metal-oxide as a channel material. The complex metal-oxide is transparent in a visible range.

The insulating layer 19a is formed above/on the transparent substrate 18.

The light-shielding patterns 20a and 20b are selectively formed above/on the insulating layer 19a.

The insulating layer 19b is formed above/on the insulating layer 19a and the light-shielding patterns 20a and 20b.

The common electrodes 21 are formed above/on the insulating layer 19b. The common electrodes 21 form, for example, comb-teeth-shaped or stripe-shaped for each pixel or sub-pixel.

The insulating layer 19c is formed above/on the insulating layer 19b and the common electrodes 21.

The pixel electrodes 22 are formed above/on the insulating layer 19c.

An alignment film 23 is formed above/on the insulating layer 19c and the pixel electrodes 22.

The pixel electrodes 22 may form, for example, comb-teeth-shaped or stripe-shaped for each pixel or sub-pixel. The pixel electrodes 22 are electrically connected to the active element 24.

A transparent electrode 4 side of the counter substrate 8 faces the liquid crystal layer 17, and the transparent substrate 2 side faces the observer.

Each transparent electrode 4 is parallel to the two sides (sidelines) of the frame pattern B1 of the black matrix BM, and the longitudinal direction of the central pattern B2, the pixel electrodes 22, and the common electrodes 21.

The transparent electrodes 4 are located symmetrically to the central axis C passing through a central pattern B2 in the cross-section of FIG. 13 vertical to the longitudinal direction of the two sides of the frame pattern B1. Positions of the transparent electrodes 4 shift from positions of the corresponding pixel electrodes 22 in the horizontal direction F2 of the cross-section of FIG. 13.

The longitudinal direction of the pixel electrodes 22 and the longitudinal direction of the common electrodes 21 are parallel to each other. The pixel electrode 22 is partly overlapped with the common electrode 21 in the vertical direction F2 of the plane surfaces of the transparent substrates 2 and 18 through the insulating layer 19c. A part of the common electrode 21 protrudes from the pixel electrode 22 to the central axis C side of the pixel or the sub-pixel in a horizontal direction F2 of the cross-section of FIG. 13.

A width W4 of the light-shielding pattern 20b of the array substrate 16 is wider than a width W5 of the frame pattern in the horizontal direction F2 of the cross-section of FIG. 13. The light-shielding pattern 20b is overlapped with the frame pattern B1 at a position in the vertical direction F1. The light-shielding patterns 20a and 20b are, for example, formed by a light-reflective metal thin film.

For example, liquid crystal molecules included in the liquid crystal layer 17 have a negative dielectric anisotropy, and an initial alignment of a longitudinal direction of the liquid crystal molecule is vertical.

The liquid crystal display device 15 having a structure as described above will be explained in detailed below.

In the liquid crystal display 15, the array substrate 16 includes the active element 24 such as a thin film transistor (hereinafter referred to as TFT), and the pixel electrodes 22.

The counter substrate 8 includes the stripe transparent electrodes 4. The transparent electrode 4 and the pixel electrode 22 have a positional relation which is parallel and shift in the planar view. The counter substrate 8 includes the black matrix BM. The frame pattern B1 of the black matrix BM forms the openings. For example, the frame pattern B1 may form polygon openings. The polygon opening includes have facing sides which are parallel to each other. The black matrix BM includes the central pattern B2. The central pattern B2 is parallel to the side lines of the frame pattern B1 and passes through a center of the opening in the planar view. As the polygon whose facing sides are parallel to each other, for example, a rectangle, a parallelogram or a "<"-shaped bending polygon is used.

TFT may be formed by a silicon semiconductor or an oxide semiconductor. For example, when the active element 24 is easily influenced by light, as a case in which the line width W5 of the frame pattern B1 of the black matrix BM is narrower than the width W4 of the light-shielding pattern 20b of the array substrate 16, like in this embodiment, it is preferable to use a TFT with a channel material including an oxide semiconductor having a low light sensitivity. When the oxide semiconductor TFT is used, even if the black matrix BM having a narrow line width W5 is used, a malfunction due to an influence of a visible light can be avoided. Also, a pixel or a sub-pixel opening ratio when the oxide semiconductor TFT is used can be more increased than an opening ratio when the silicon semiconductor TFT is used, and therefore, it is desirable to use the oxide semiconductor TFT in terms of this aspect. As a typical channel material for the oxide semiconductor TFT, for example, a complex metal-oxide including indium, gallium and zinc, which are called IGZO, are used. The liquid crystal display device 15 using the oxide semiconductor TFT capable of securing a high opening ratio has a merit that an alignment treatment (to provide a pre-tilt angle) of an alignment film can be easily performed by light alignment and voltage application after liquid crystal cell forming.

A complex metal-oxide which is transparent in a visible region can be applied to the oxide semiconductor. Semiconductor materials including such a metal oxide as a component may be, oxides including at least two elements of, for example, zinc, indium, tin, tungsten, magnesium and gallium. As the oxide semiconductor, for example, materials such as zinc oxide, indium oxide, indium zinc oxide, tin oxide, tungsten oxide (WO), zinc gallium indium oxide (In—Ga—Zn—O), indium gallium oxide (In—Ga—O), zinc tin oxide (Zn—Sn—O), and zinc silicon tin oxide (Zn—Sn—Si—O) are used, and other materials may be used. Such a material is substantially transparent, and has a band gap of preferably 2.8 eV or more, more preferably 3.2 eV or more. Such a material may have any structure of a single crystal, a polycrystal, a microcrystal, a mixed crystal of crystal/amorphous, an amorphous in which nanocrystals are dispersed, and an amorphous. The oxide semiconductor layer has preferably a film thickness of 10 nm or more. The oxide semiconductor layer is formed by using a sputtering method, a pulsed laser deposition method, vacuum deposition method, a CVD (Chemical Vapor Deposition) method, an MBE (Molecular Beam Epitaxy) method, an inkjet method, a printing method, or the like. The oxide semiconductor layer is preferably formed by using the sputtering method, the pulsed laser deposition method, the vacuum deposition method, the inkjet method, or the printing method. In the sputtering method, an RF magnetron sputtering method and a DC sputtering method can be used, and the DC sputtering method is more preferably used. As a starting material (a target material) for sputtering, for example, oxide ceramic materials and metal target materials can be used. In the vacuum deposition, for example, a heating deposition, an electron beam deposition, and an ion plating method can be used. In the printing method, for example, a transfer printing, a flexography, a gravure printing, a gravure offset printing, or the like may be used, or other methods may be used. In the CVD method, a hot-wire CVD method, a plasma CVD method, or the like can be used. In addition, other methods such as a method in which a hydrate of an inorganic salt (such as a chloride) of the metal described above is dissolved in an alcohol, which is fired and sintered to form an oxide semiconductor may be used.

In this embodiment, the liquid crystal molecule having negative dielectric anisotropy is explained, but the liquid crystal molecule having positive dielectric anisotropy may be applied to this embodiment. When the dielectric anisotropy of the liquid crystal molecule is positive, the liquid crystal molecule has an initial horizontal alignment, and the liquid crystal molecule stands up for a substrate surface by application of a drive voltage. As the liquid crystal material, a liquid crystal material including a fluorine atom in its molecular structure (hereinafter referred to as a fluorine-containing liquid crystal) may be used.

In this embodiment, the transparent electrode 4 faces the pixel electrode 22. The transparent electrode 4 and the pixel electrode 22 are in a positional relation that the transparent electrode 4 and the pixel electrode 22 shift from each other in the horizontal direction F2. An oblique electric field is applied between the transparent electrodes 4 and the pixel electrodes 22. A liquid crystal drive using the oblique electric field can drive the liquid crystal material by a low dielectric constant in comparison with a liquid crystal drive using a conventional longitudinal electric field. When the liquid crystal drive using the conventional longitudinal electric field is performed by a liquid crystal display device using the vertically alignment liquid crystal material, it is necessary to previously determine an inclination direction of the liquid crystal molecules, because the inclination direction of the liquid crystals is not determined upon the application of voltage. For example, a pre-tilt angle of about 0.1° to 1.5° from a normal line of a substrate surface is provided to liquid crystal molecules by using an alignment film. On the other hand, in this embodiment, liquid crystal molecules are driven by applying the oblique electric field, whereby liquid crystal molecules can be driven, without providing the pre-tilt angle to liquid crystal molecules using the alignment film.

In this embodiment, a substantially strong electric field is generated between the pixel electrode 22 of the array substrate 16 and a protrusion part (shift part) 21a of the common electrode 21 upon application of a voltage for liquid crystal drive. This electric field can drive the liquid crystal molecules at a high speed even if the liquid crystal material having the low dielectric constant (a small dielectric anisotropy) is used. In addition, the liquid crystal molecules can be driven at a low voltage due to an action of the protrusion part 21a, and therefore it is possible to reduce electricity consumption. In general, a liquid crystal material having a small dielectric anisotropy has a low viscosity, and therefore, when an electric field strength having a comparable level is applied, a high speed response can be obtained. The fluorine-containing liquid crystal has a low dielectric constant, incorporates only a small amount of ionic impurities, has a reduced performance degradation such as a decreased voltage retention caused by impurities, and is not likely to causes display nonuniformity and display burning. As the liquid crystal whose dielectric anisotropy is negative, for example, a nematic liquid crystal having a birefringence of about 0.1 at room temperature may be used. As a liquid crystal whose dielectric anisotropy is positive, various liquid crystal materials can be applied. A thickness of the liquid crystal layer 17 is not particularly limited. And of a liquid crystal layer 17 effectively applicable in this embodiment is, for example, a range of about 300 nm to 500 nm.

For example, a polyimide organic polymer film or an organic polymer film having a polysiloxane structure is heated, and the resulting heated hard film can be used as the alignment film 23. As the alignment film 23, an alignment sustained layer that a pre-tilt angle of, for example, about 0.1° to 1.5° is provided by a photo-alignment of ultraviolet or the like, or applying both of a photo-alignment and voltage application after the liquid crystal cell forming, may be used. The light used in the alignment treatment to the alignment film 23 may be a polarized light or non-polarized light. When a voltage close to liquid crystal driving condition is applied to the pixel electrodes 22 or the like after the liquid crystal cell forming (the conversion into liquid crystal cells), it is possible to determine an inclination direction of the liquid crystal molecules. When the pre-tilt angle is provided to the alignment film 23, the liquid crystal driving voltage can be reduced, and the liquid crystal display device 15 having a reduced electricity consumption can be provided.

In FIG. 13, a polarizing plate and a retardation plate are not illustrated, but one to three retardation plates may be pasted to a surface or a back surface of the polarizing plate in the liquid crystal display device 15.

The counter substrate 8 includes the transparent substrate 2 such as glass, the black matrix BM including the frame pattern B1 and the central pattern B2, the transparent pattern 9, a color layer 7 including multiple colors, the transparent resin layer 3, the stripe transparent electrodes 4 and an alignment film 25. The frame pattern B1 includes two linear sides facing each other in parallel. Here, both "linear" and "stripe" refer to a pattern having a certain width. For example, a "stripe" has a wider width than a "linear". In this embodiment, the linear two sides included in the frame pattern B1 are stripe-shaped, and the multiple transparent electrodes 4 are also stripe-shaped. In this embodiment, a picture line width of a "linear" "stripe (band)" or "stripe-shaped" can be suitably configured based on a condition such as a screen size of a liquid crystal display, a necessary opening ratio or a light transmission angle described below. The position of the transparent electrode 9 is not particularly limited in a cross-sectional view as in FIG. 13, and it may be located at an upper part of the transparent resin layer 3, between the transparent substrate 2 and the black matrix BM, between the black matrix and the color layer 7, or between the color layer 7 and the transparent substrate 3. The shape of the pixel or the sub-pixel is, for example, a parallelogram as in FIG. 10 illustrated above in a planar view. An angle of inclination in a parallelogram is, for example, 30°, which does not cause moire upon the three-dimensional image display. In addition, in FIG. 10, the central pattern B2 of the black matrix BM located at the center of the pixel or the sub-pixel is omitted.

The array substrate 16 includes a transparent substrate 18 such as glass, insulating layers 19a to 19c, light-shielding patterns 20a and 20b, common electrodes 21, pixel electrodes 22 and an alignment film 23. The common electrode 21 has a common potential (common) which is the same as that of the stripe transparent electrode 4. In a use that a high speed response of liquid crystal molecules is not greatly required, the common electrodes 21 of the array substrate 16 side may be omitted. For the light-shielding patterns 20a and 20b, a metal thin film used for wiring the active element 24 may be used. As the light-shielding patterns 20a and 20b, for example, a thin film of copper or aluminum, or a thin film of an alloy thereof may be used. As the light-shielding patterns 20a and 20b, for example, a lamination pattern may be used. The lamination pattern may be formed by laminating a thin film of a high melting point metal such as molybdenum, titanium or chromium on the a thin film of a metal such as copper or aluminum. When a thin film of, for example, aluminum, silver or an alloy thereof is used as the light-shielding patterns 20a and 20b, this light-shielding pattern 20b can be used as a reflective film of a light of a transflective liquid crystal display device described below. When an aluminum or aluminum alloy thin film is used, aluminum oxide ($Al_2O_3$) may be used as a protective layer.

In this embodiment, the transparent electrodes 4, the pixel electrodes 22, the common electrode 21, the two sides of the frame pattern B1 of the black matrix BM, and the central pattern B2 are parallel to each another in a longitudinal direction. In a pixel or a sub-pixel, the multiple transparent electrodes 4 and the multiple pixel electrodes 22 are located axial-symmetrically based on the central axis C passing through the central pattern B2. In a pixel or a sub-pixel, the multiple transparent electrodes 4 and the multiple pixel electrodes 22 are in a shift positional relation. In the shift positional relation, the multiple transparent electrode 4 and a correlating multiple pixel electrode 22 shift from each other in the horizontal direction F2 (in the planar view). In a location relation between the transparent electrode 4 of the counter substrate 8 and the common electrode 21 of the array substrate 16, the pixel electrode 22 is put between the transparent electrode 4 and the common electrode 21 in the vertical direction F1, and the transparent electrode 4 and the common electrode 21 shift from each other in the horizontal direction F2.

Using FIG. 14 and FIG. 15 which are ½ partial cross-sectional views of a pixel or a sub-pixel, an action of liquid crystal molecules of the liquid crystal layer 17 of the liquid crystal display device 15 will be explained below.

Figure 14:
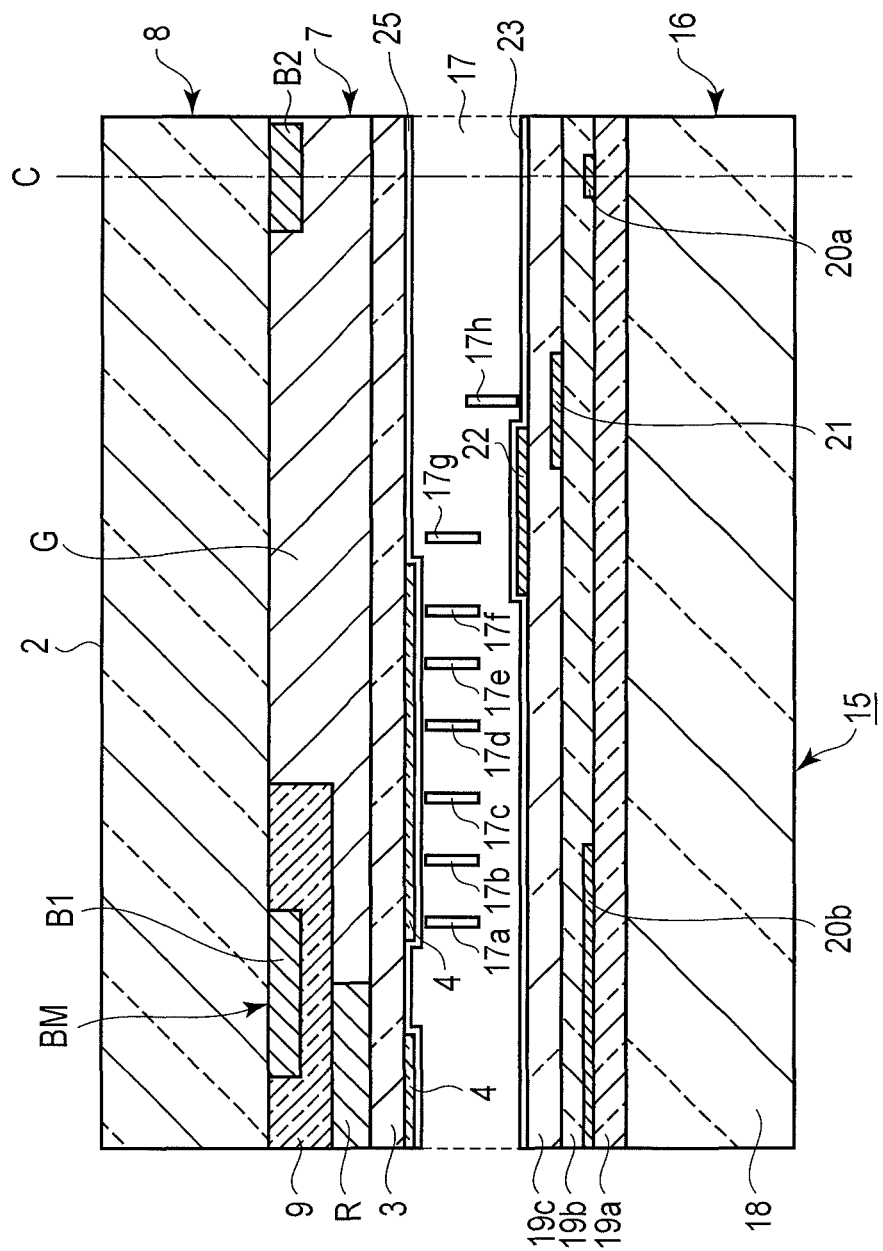
FIG. 14 is a partial cross-sectional view showing an example of states of liquid crystal molecules on a left side from a central axis of a pixel or a sub-pixel when a drive voltage is not applied.

FIG. 14 is a partial cross-sectional view showing an example of states of liquid crystal molecules on a left side from the central axis C of the pixel or the sub-pixel when a drive voltage is not applied.

In FIG. 14, liquid crystal molecules 17a to 17h are vertically aligned to each surface (each top surface of aligned films 23 and 25) of the array substrate 16 and the counter substrate 8 when a drive voltage is not applied.

Figure 15:
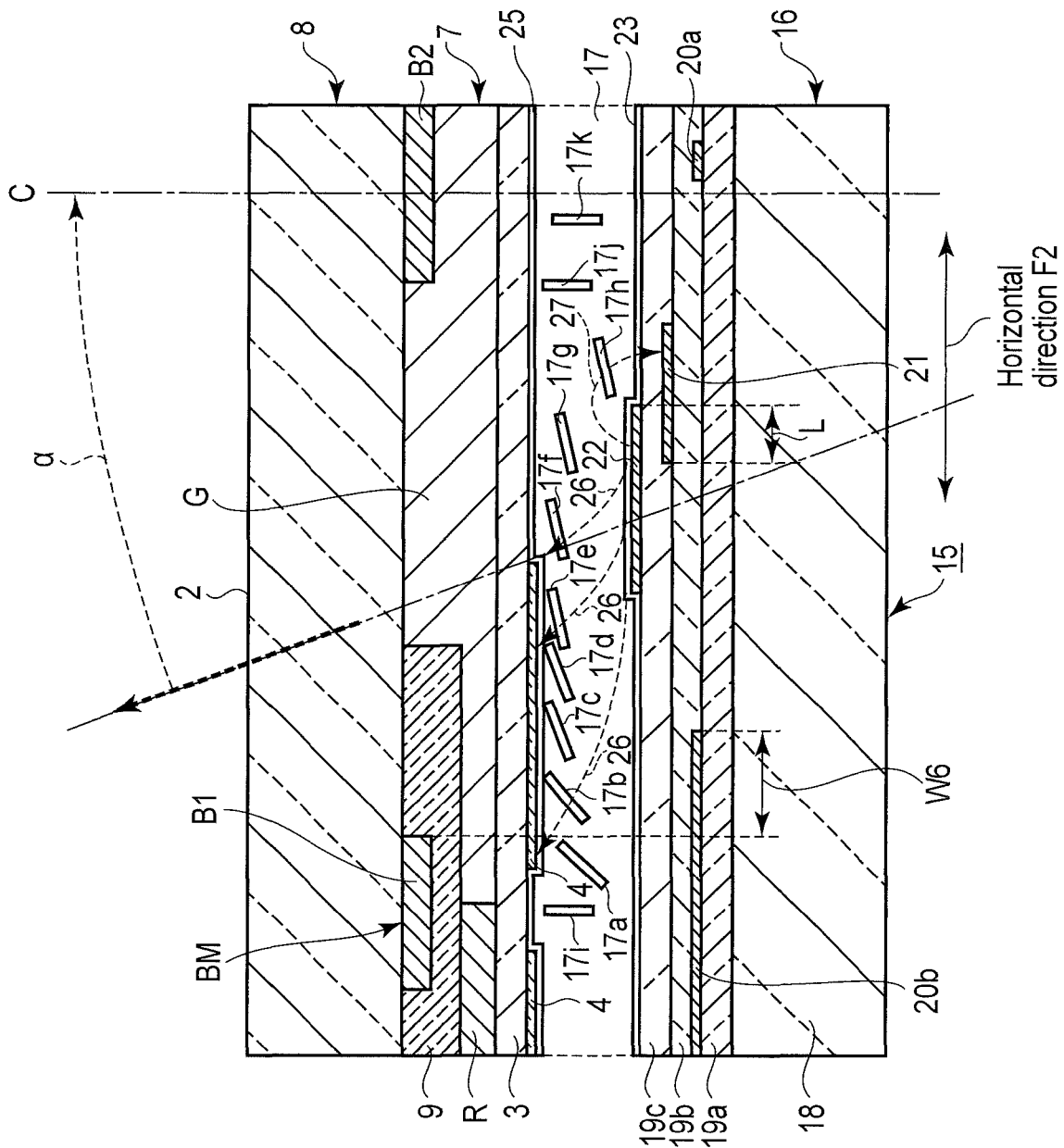
FIG. 15 is a partial cross-sectional view showing an example of states of liquid crystal molecules on the left side from the central axis of the pixel or the sub-pixel when the drive voltage is applied.

FIG. 15 is a partial cross-sectional view showing an example of states of the liquid crystal molecules on the left side from the central axis C of the pixel or the sub-pixel when the drive voltage is applied.

As shown in FIG. 15, a line of electric force 26 is formed from the pixel electrode 22 of the array substrate 15 toward the transparent electrode 4 with a common potential of the counter substrate 8 when the drive voltage is applied, and the liquid crystal molecules 17a to 17g incline so that the liquid crystal molecules 17a to 17g are vertical to the line of electric force 26.

On an array substrate 16 side, a line of electric force 27 is formed from the pixel electrode 22 to the common electrode 21 upon application of the drive voltage, and the liquid crystal molecule 17h inclines so that the liquid crystal molecule 17h is vertical to the line of electric force 27.

An inclination amount (change in tilt) of the liquid crystal molecules 17a to 17h is almost determined by a voltage and a position to the pixel electrode 22. In the cross-section of FIG. 15, longitudinal directions of the liquid crystal molecules 17a to 17h incline. The liquid crystal molecules 17a to 17h is located in the opening from a center of the pixel or the sub-pixel to its left side. But the liquid crystal molecules 17i to 17k keep almost vertical alignment. The liquid crystal molecules 17i to 17k is located in the vicinity just under the frame pattern B1 and central pattern B2 of the black matrix BM.

A light transmission angle (angle of outgoing) a can be provided to a light from the opening of the pixel or the sub-pixel based on a bias of inclinations of the liquid crystal molecules 17a to 17k, configuration of sizes of the frame pattern B1 and the central pattern B2 of the black matrix BM, and light-shielding patterns 20a and 20b of the array substrate 16. This light transmission angle can be emphasized by synchronizing emission of solid light emitters with a liquid crystal drive. The solid light emitters may be provided on both sides of an edge light. The edge light may be a back light described below. For example, when LED used as a solid light emitter are located collectively at opposite corners and is not used only as an edge light, the three-dimensional image display can be realized horizontally and vertically, and a visibility for a user can be improved.

The transparent pattern 9 shown in FIG. 15 can increase an outgoing light amount from a frame side (a left side of the cross-section of FIG. 15) of an opening (light transmission) part of the pixel or the sub-pixel. A film thickness of a part of the color layer 7 which is overlapped with the transparent pattern 9 is thin in the vertical direction F1. For this structure, a transmitted light amount from an edge part of the opening of the pixel or the sub-pixel can be increased.

As described above, the liquid crystal display device 15 according to this embodiment has multiple regions whose transmittance is different from each other in the pixel or the sub-pixel in the horizontal direction F2. For example, a usual two-dimensional display is performed using the liquid crystal display device 15, a dynamic liquid crystal display with a high brightness can be realized by utilizing the outgoing light passing through the transparent pattern 9, and the observer can satisfactorily visually recognize the image even in a bright room.

Alternatively, as illustrated in FIG. 8 above, when the thickness of the color layer 7 is partly changed, a bright outgoing light from the thin color layer 7 can be utilized in a dynamic display.

Although, in FIG. 15, the left side from the central axis C is illustrated, the pixel electrode 22 illustrated in this figure and a pixel electrode 22 located on a right side from the central axis C, which is not illustrated in this figure, can be driven by using different active elements 24. When a timing of voltage application of these two pixel electrodes 22 is synchronized to emission of solid light emitters provided on both sides of an edge light described below, and a timing of an outgoing light for a right eye shifts from a timing of an outgoing light for a left eye upon three-dimensional image display, an effect of the three-dimensional image display can be enhanced.

For example, two active elements 24 are allocated to a pixel or a sub-pixel. Voltages based on different video signals are applied to the two active elements 24 whereby the liquid crystal molecules included in the liquid crystal layer 17 are drive, whereby effective three-dimensional image display can be performed.

For example, the liquid crystal display device 15 can display a two-dimensional image with a wide viewing angle when a timing of the outgoing light for the right eye and a timing of the outgoing light for the left eye are made the same, and the same video signals are provided.

In FIG. 15, a light transmission angle α, which is an angle of emergence of light, can be variously set based on a position or distance of the observer, the number of observers, a screen size of the liquid crystal display device 15, a thickness of the liquid crystal layer 17 or the color layer 7, or the like. The light transmission angle α of the three-dimensional image display device is set within a range of 2° to 20°. A width (difference in size) W6 between an edge of the black matrix BM and an edge of the light-shielding pattern 20b in the horizontal direction F2 can be suitably set. When the angles of outgoing lights from a back light described above to the right eye and the left eye are small, it is preferable to set the width W6 relatively longer such as 3 μm to 30 μm. When the light transmission angles of the outgoing lights from the back light to the left eye and the right eye are close to a desired light transmission angle α, the width W6 can be set narrower such as 0 μm to 5 μm, thereby increasing an opening ratio of pixels. An overlapping part L that the pixel electrode 22 is overlapped with the corresponding common electrode 21 in the vertical direction F1 can be utilized as an auxiliary capacity in the liquid crystal display.

In order to reduce sticking of the liquid crystal display, offset (voltage shift) may be applied to the pixel electrode 22 or the transparent electrode 4 as a drive voltage. When one pixel or one sub-pixel is driven by two or more active elements 24, a timing of drive voltage of one active element 24, or a wave shape of an applied voltage may be controlled. When the two active elements 24 are used for driving, voltage application timings by the two active elements 24 in offset may be shift each other, and amounts of voltages by the two active elements 24 in the offset may be shift each other. A common voltage which is applied to the transparent electrode 4 and the common electrode 21, can be modulated for the purpose of improvement of liquid crystal responsiveness. The number of teeth, a density, a distance and a location of the pixel electrode 22 and the common electrode 21, which are comb-teeth-shaped patterns, in the horizontal direction F2 can be suitably configured based on a size and an intended use of the liquid crystal display device 15.

In FIG. 14 and FIG. 15, the location of the pixel or the sub-pixel illustrated in FIG. 10 is used, but various locations of the pixel or the sub-pixel, as illustrated in FIG. 9, FIG. 11, FIG. 12, and the like can be used instead of the above.

FIG. 16 is a plane view showing a first example of flaw lines formed on a surface of a liquid crystal side of a pixel electrode 22.

For example, when a width of the comb-teeth-shaped pixel electrode 22 is more than 4 μm, or a wide pixel electrode 22 formed in rough pitches for applying to a large-scale liquid crystal display or pixels of 250 ppi (pixels per inch) or less is used, a concavity or a flaw line may be formed on a surface (a surface on the liquid crystal side) of the pixel electrode 22, in order to provide easy inclination of liquid crystal molecules or fluctuation of liquid crystal alignment. In an example of FIG. 16, one or more flaw lines 221 having a width of 1 μm or less are formed on the surface of the comb-teeth-shaped pixel electrode 22 so that the flaw lines 221 form in substantially parallel to a longitudinal direction of the pixel electrode 22 (in substantially vertical to the horizontal direction of the cross-sections of FIGS. 13 to 15).

FIG. 17 is a plane view showing a second example of flaw lines formed on the surface on the liquid crystal side of the pixel electrode 22.

For example, one or more flaw lines 222 having a width of 1 μm or less are formed on the comb-teeth-shaped pixel electrode 22 so that the flaw lines 222 form in substantially vertical to the longitudinal direction of the pixel electrode 22 (in substantially parallel to the horizontal direction of the cross-sections of FIGS. 13 to 15).

The flaw lines 221 or 222 is formed on the surface of the pixel electrode 22, whereby a texture appears as a flaw line on an alignment film or an alignment sustained layer formed above/on the pixel electrode 22. Specifically, when a pixel electrode 22 is formed from a transparent conductive film such as ITO, slightly etching is performed linearly on a surface of ITO having a thickness of 150 nm, and flaw lines 221 or 222 having a depth of 20 nm to 40 nm and a width of about 1 μm are formed. In addition, when a thin alignment film or alignment sustained layer having a thickness of about 50 nm is formed on a pixel electrode 22, a texture of flaw lines 221 or 222 appears on a surface of the alignment film or the alignment sustained layer. The formation of the flaw lines 221 or 222 can be realized by slightly etching providing a depth of 20 nm to 40 nm. The flaw line may have a width of less than 1 μm, and a depth of 50 nm or more. In a part of area in which the pixel electrode 22 is not overlapped with the common electrode 21 in a planar view, the flaw lines 221 or 222 having a depth almost comparable with the thickness of the transparent conductive film are formed, and slits may be formed in the pixel electrode 22. A taper may be formed for the flaw line 221 or 222 in a cross-sectional view. The flaw line formed by etching may have a width of 1 μm or less at a bottom part of the flaw line. A pitch forming the flaw lines 221 and 222 can be, for example, from about 2 μm to 10 μm.

When an oblique electric field is generated between the pixel electrode 22 and the transparent electrode 4, the liquid crystal molecules above/on the pixel electrode 22 may uniformly incline in the protrusion direction of the common electrode 21 based on the flaw lines 221 and 222. The protrusion direction is about parallel to the perpendicular direction with respect to the longitudinal direction of the common electrode 21. According to a wide pixel electrode 22 having no flaw lines 221 and 222, liquid crystal molecules incline disproportionally at corner parts and midsections in the planar view of the pixel electrode 22, and streak and/or nonuniformity of a transmittance easily occur on the pixel electrode 22 and in the sub-pixel. The streak and/or the nonuniformity lead to a reduced transmittance of sub-pixels. In addition, liquid crystal molecules at the upper part of the flaw lines 221 or 222 are vertically aligned, and, at the same time, influenced by texture expressed by the flaw lines to easily incline at a low voltage, whereby a high speed drive can be realized. In the flaw lines 221 or 222, one or multiple lines are formed depending on the width of the pixel electrode 22. If the width of the pixel electrode 22 is as narrow as 4 μm or less, flaw lines may not be formed.

As described above, according to this embodiment, the three-dimensional image display can be effectively performed. In addition, according to this embodiment, bright image display can be performed in a high resolution.

[Second Embodiment]

In this embodiment, a liquid crystal display device including four active elements 24 to a pixel or a sub-pixel will be explained.

Figure 18:
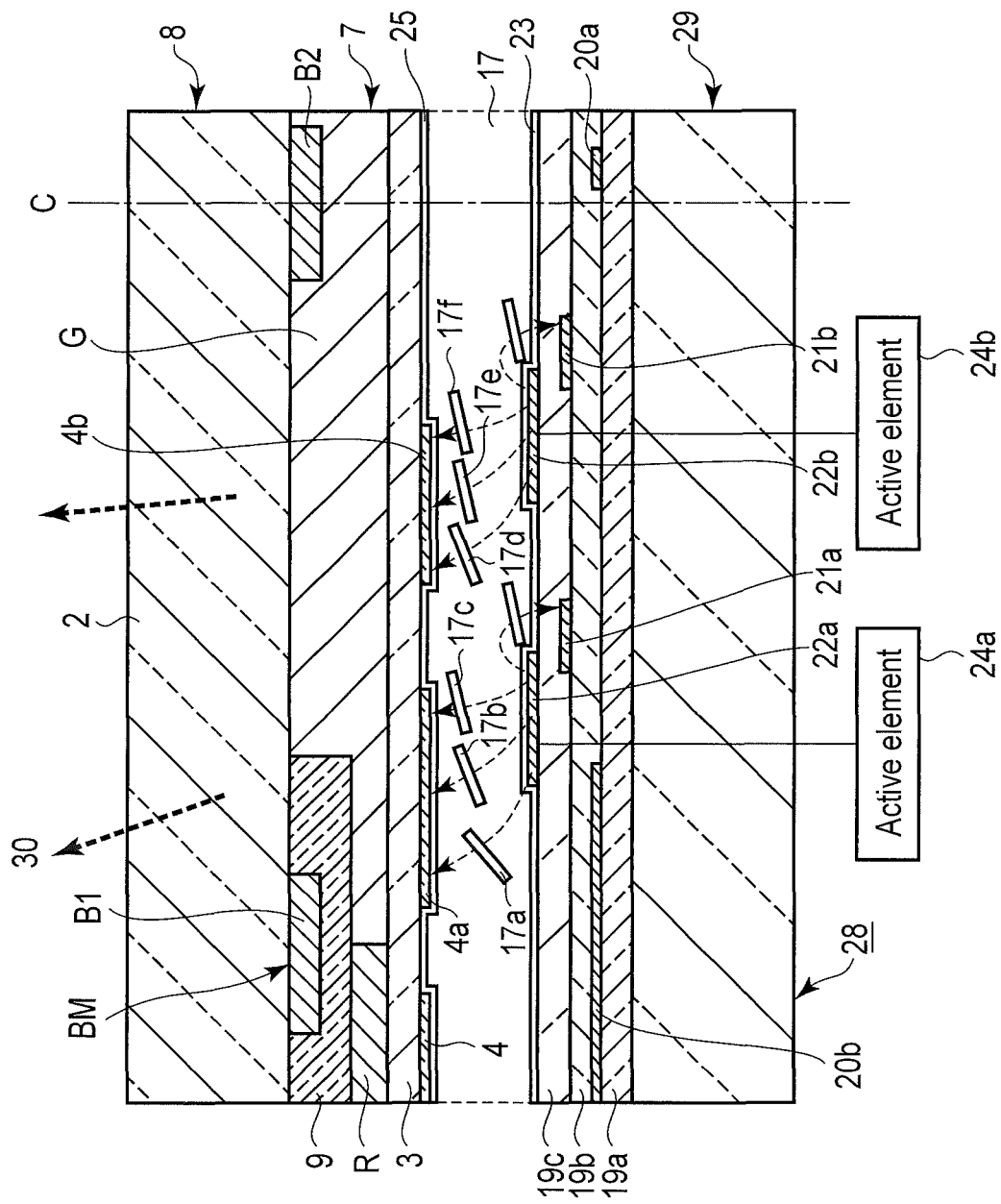
FIG. 18 is a partial cross-sectional view showing an example of a structure of a liquid crystal display device according to a second embodiment.

FIG. 18 is a partial cross-sectional view showing an example of a structure of a liquid crystal display device according to this embodiment. FIG. 18 is a ½ partial cross-sectional view of a pixel or a sub-pixel, and illustrates only a left side from a central axis C of the pixel or the sub-pixel. In this embodiment, a structure on a right side from the central axis C of the pixel or the sub-pixel is symmetrical to the structure on the left side of FIG. 18.

A liquid crystal display device 28 includes two stripe transparent electrodes 4a and 4b, two pixel electrodes 22a and 22b, two common electrodes 21a and 21b, and two active elements 24a and 24b in the left side of the cross-section. In a pixel or a sub-pixel unit of the liquid crystal display device 28, accordingly, four pixel electrodes, four common electrodes, four active elements are provided.

In the left side of the cross-section, the two pixel electrodes 22a and 22b of an array substrate 29 are electrically connected to the two active elements 24a and 24b, respectively.

The liquid crystal display device 28 according to this embodiment is different from the liquid crystal display device 15 according to the first embodiment in that the two pixel electrodes 22a and 22b, and the common electrodes 21a and 21b are provided on the left side of the cross-section, and the two active elements 24a and 24b are connected to the two pixel electrodes 22a and 22b.

According to the liquid crystal display device 28 of this embodiment, the two pixel electrodes 22a and 22b, and the common electrodes 21a and 21b are provided on the right side of the cross-section of the pixel or the sub-pixel, in the same way as in the left side of the cross-section, and the two active elements 24a and 24b are connected to the two pixel electrode 22a and 22b.

For this structure, oblique outgoing of light necessary for the three-dimensional image display can be emphasized. The pixel electrode 22a, which is located close to an edge of an opening of the pixel or the sub-pixel, can drive independently liquid crystal molecules 17a to 17c, whereby an amount of oblique outgoing light 30 having an angle can be increased through a transparent pattern 9.

According to the liquid crystal display device 28 of this embodiment described above, for example, an image for a right eye is output through a left side of the pixel or the sub-pixel illustrated in FIG. 18, and an image for a left eye is output through a right side of the pixel or the sub-pixel, which is not illustrated. In addition, the pixel electrodes 22a and 22b are provided on both left and right sides of the cross-section, and therefore, when different video signals, for example, signals of a deep background image and signals of a popping image located on a front side are sent to a right side of the pixel electrodes 22a and 22b and a left side of the pixel electrodes 22a and 22b, a further three-dimensional image can be displayed.

Further, according to this embodiment, four active elements are allocated to a pixel or a sub-pixel, and different voltages based on different video signals are applied to the four active elements, whereby liquid crystal molecules included in the liquid crystal layer 17 are driven. For example, the signals sent to the four active elements are synchronized to solid light emitters such as LED of a back light placed on a back surface of the liquid crystal display device 28, whereby an image for a right eye, an image for a left eye, a background image and a popping image can be displayed at different timings.

[Third Embodiment]

In this embodiment, a transflective liquid crystal display device will be explained. The same structure is applicable to a liquid crystal display device for displaying a three-dimensional image.

Figure 19:
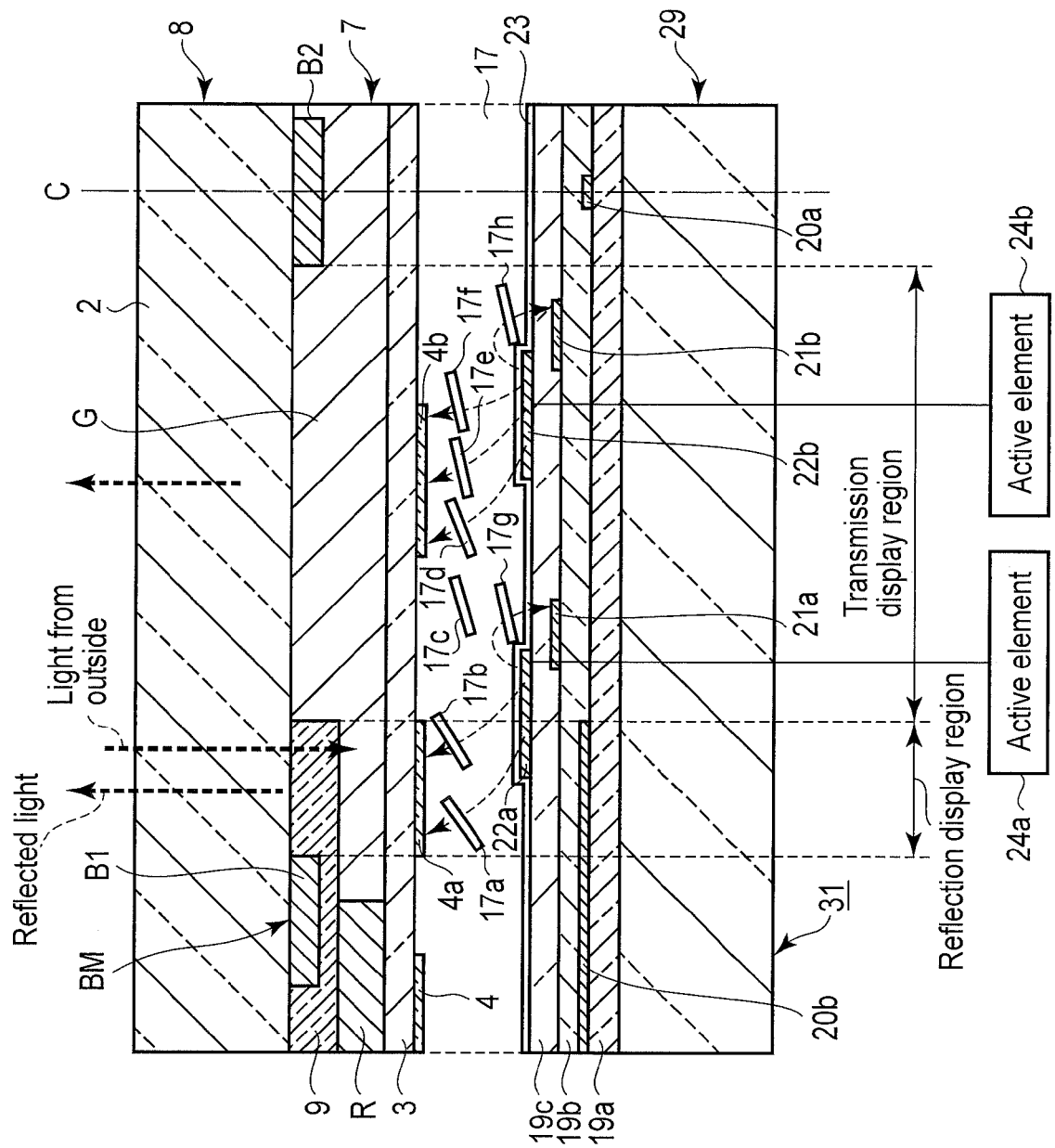
FIG. 19 is a partial cross-sectional view showing an example of a structure of a liquid crystal display device according to a third embodiment.

FIG. 19 is a partial cross-sectional view showing an example of a structure of a liquid crystal display device according to this embodiment. FIG. 19 is a ½ partial cross-sectional view of a pixel or a sub-pixel, and illustrates only a left side from the central axis C of the pixel or the sub-pixel. In this embodiment, a structure on a right side from the central axis C of the pixel or the sub-pixel is symmetrical to the structure on the left side of FIG. 19.

In a liquid crystal display device 31 according to this embodiment, two active elements 24a and 24b are provided to a pixel or a sub-pixel unit.

Both of the pixel electrode 22a located at an edge side of the pixel or the sub-pixel in a left side of the cross-section of FIG. 19, and the pixel electrode 22a located at an edge side of an opening in a right side, which is not illustrated, are electrically connected to the active element 24a together.

Both of the pixel electrode 22b located at a central side of the pixel or the sub-pixel in the left side of the cross-section of FIG. 19, and the pixel electrode 22b located at a central side of the pixel or the sub-pixel in the right side, which is not illustrated, are electrically connected to the active element 24b together.

In this embodiment, a light-shielding pattern 20b of an array substrate 29 is used as a reflective film of a light from outside. The light-shielding pattern 20b is a thin film which easily reflects light, such as aluminum, an aluminum alloy, or silver alloy. The light-shielding pattern 20b reflects the light from outside. The light source of the light from outside is a bright room light or sunlight. The reflected light is utilized for display.

Fine irregularities may be formed on a surface of the light-shielding pattern 20b, for providing a light scattering property.

The transparent pattern 9 may be formed by a light-scattering film. Transparent fine particles having a different index of refraction from that of a transparent resin of the transparent pattern 9 is dispersed in the transparent resin to form the light-scattering film.

The transparent pattern 9, the light-shielding pattern 20b and the color layer 7 may have a light-scattering property. The transparent pattern 9, the light-shielding pattern 20b and the color layer 7 can be used as a technique for eliminating moire upon the three-dimensional image display.

FIG. 19 illustrates a state (light transmitting state) in which a drive voltage is applied between the pixel electrodes 22a and 22b, and transparent electrodes 4a and 4b with a common potential, and between the pixel electrodes 22a and 22b, and common electrodes 21a and 21b with a common potential, whereby the liquid crystal molecules 17a to 17h incline. The light from outside such as sunlight is reflected by the light-shielding pattern 20b to convert it into an outgoing light, whereby a reflection display is performed. In this case, a light of a reflection display region passes twice through the liquid crystal layer 17. In a transmission display region, a light from a backlight source passes once through the liquid crystal layer 17. An optical path length in the reflection display region is twice that in the transmission display region. A difference of optical passes between the reflection display region and the transmission display region can be controlled by differentiating an inclination angle of the liquid crystal molecules 17a and 17b in the reflection display region from an inclination angle of the liquid crystal molecules 10d, 17e and 17f in the transmission display region (a difference of Δnd is made). In other words, a voltage applying to the pixel electrode 22a used for a display of the reflection display region is differentiated from a voltage applying to the pixel electrode 22b used for a display of the transmission display region. As a result, the inclination angle of the liquid crystal molecules in the reflection display region and the transmission display region can be controlled, and a transflective display can be optimized.

In this embodiment, a structure in which four active elements are provided to one pixel or one sub-pixel is explained. However, one active element may be provided to a ½ pixel or a ½ sub-pixel, and the total two active elements may be provided to one pixel or one sub-pixel. For example, liquid crystal driving in which a slope steepness is provided to the liquid crystal molecules 17a to 17h using the pixel electrode 22b, which is located near to the center of a ½ pixel or a ½ sub-pixel, is performed to realize the transflective display.

[Fourth Embodiment]

In this embodiment, a liquid crystal display device in which a light-controlling element having a light-refraction function is provided to at least one of a back surface of an array substrate side and a surface of a counter substrate side will be explained.

FIG. 20 is a cross-sectional view showing an example of a liquid crystal display device according to this embodiment. FIG. 20 is a cross-sectional view in a vertical direction.

The liquid crystal display device 15 includes a lenticular lens (lens sheet) 32 and a back light unit 33 in addition to the constituents in FIG. 13 in the first embodiment described above.

In this embodiment, the liquid crystal display device 15 includes the lenticular lens 32 and the back light unit 33 on a back surface side of the array substrate 16.

The lenticular lens 32 may be a semicylindrical lens having a width of two or other even number of units (pixels). The lenticular lens 32 has an optical axis vertical to the cross-section of FIG. 20. In other words, in the lenticular lens 32, the longitudinal direction of the semicylindrical lens is vertical to the cross-section of FIG. 20. The order of colors of the sub-pixel in the width of two or other even number units is that a red sub-pixel→a green sub-pixel→a blue sub-pixel, and this series is repeated twice or other even number times. For this mechanism, homogeneity of emissions in three-color pixel can be secured.

The back light unit 33 is a light source including solid light emitters 34a and 34b such as LED, a reflector 35, and a prism sheet 36 integrated into a light-guiding plate. In this embodiment, the back light 33 is an edge-light type light-guiding unit. An array of solid light emitters 34a and 34b of the edge-light type light-guiding unit is provided on a back surface of the array substrate 16.

The prism sheet 36 is a triangle form in a cross-sectional view as shown in FIG. 20. Angles of the triangle are set so that light transmission angles of outgoing lights 37a and 37b from the liquid crystal display device 15 are within a range of about 2° to 20° based on the lenticular lens 32 and the combination of pixel constituent described above. The light transmission angle is controlled based on a size of a screen of the liquid crystal display device 15, and the position of the observer to be expected (including a selection of the binocular type or the multiocular type).

For example, the light-controlling element having light-refraction function such as the lenticular lens 32 and the prism sheet 36 refracts a light in the vertical direction to the longitudinal direction of the pixel electrode 4.

In this embodiment, the plane surface shape of the pixel or the sub-pixel is the same as that in FIG. 10 illustrated above. In this case, interference (moire) due to a pixel or a sub-pixel arrangement and the lenticular lens 32 is not caused.

The light transmission angle can be controlled by a shape of the lenticular lens, or a position of a liquid crystal panel and a light-controlling element such as the prism sheet in the direction to the observer. In order to provide directivity to the lenticular lens, the lenticular lens may be formed so that a cross-section shape of the lenticular lens in a display screen has a bias. For example, the lenses at edges of the display screen may be controlled so that they provides a light transmission angle leading to a center of the screen by using eccentric lenses or aspherical lenses.

In this embodiment, a control section 38 controls so that emitting of arrays of solid light emitters 34a and 34b synchronizes to video signals applied to an active element 24.

For example, the liquid crystal drive of the left side of the cross-section of the pixel or the sub-pixel, explained using FIG. 13 in the first embodiment, is synchronized to the solid light emitter 34b of the right side shown in FIG. 20. Also, according to this embodiment, for example, the liquid crystal drive of the right side of the cross-section of the pixel or the sub-pixel is synchronized to the solid light emitter 34a of the left side.

According to this embodiment, the video signals are synchronized to the back light unit 33, the optical element including the lenticular lens 32 and the prism sheet 36 is provided, and the three-dimensional image display can be realized in a high resolution.

In the liquid crystal display device 15 according to this embodiment, when single observer (binocular) is supposed, a structure having no lenticular lens 32 may be used. The solid light emitters 34a and 34b may be white LED, or individually emitting LED of RGB.

In this embodiment, at least one of the one or more lenticular lenses 32 and the one or more prism sheets 36 may be provided as the light-controlling element.

In this embodiment, a prism sheet on which prisms are formed on both sides may be used as the light-controlling element. Shapes and pitches of the prisms formed on the both sides may be configured depending on the three-dimensional image display. For example, one surface of a double-sided prism sheet may have a triangle cross-section, and another surface of the double-sided prism sheet may have a larger pitch than that of the one surface. When the double-sided prism sheet integrally formed is used as an optical control element, a different angle θ may be provided between an optical axis of one surface of the double-sided prism sheet and an optical axis of the other surface of the double-sided prism sheet.

[Fifth Embodiment]

In this embodiment, an angle θ is provided between an optical axis of a lenticular lens or an optical axis of a prism sheet, and an arrangement direction of pixels or sub-pixels in a planar view to reduce moire.

For example, when rectangular (such as a rectangle) pixels or sub-pixels in the planar view, as illustrated in FIG. 12 above, are used, an interference may be generated between an arrangement of the lenticular lens 32 and the prism sheet 36 explained in the forth embodiment above, and the pixel or the sub-pixel arrangement. Thus, moiré may be generated based on the interference.

In this embodiment, as illustrated in FIG. 21, e for eliminating the moire is provided to an optical axis 32a of the lenticular lens 32 and an optical axis 36a of the prism sheet 36 in a planar view.

For example, in the counter substrate 8 of the liquid crystal display device 15 according to the fourth embodiment described above, rectangular pixels or sub-pixels are arranged. Also, the array substrate 16 is the same as that in each embodiment described above. The liquid crystal display device 15 is formed by pasting the counter substrate 8 and the array substrate 16 together so that the liquid crystal layer 17 is put between the counter substrate 8 and the array substrate 16. The liquid crystal molecules of the liquid crystal layer 17 have negative dielectric anisotropy, and are vertically aligned. And the liquid crystal display device 15 further includes the polarizing plate and the retardation plate to the surface or back surface thereof.

When an angle θ formed by the optical axis 32a of the lenticular lens 32 and the optical axis 36a of the prism sheet 36 is set about 30°, the liquid crystal display device 15 can realize the three-dimensional image liquid crystal display without occurrence of the moire.

[Sixth Embodiment]

In this embodiment, a liquid crystal display device including the counter substrate 5 of FIG. 2 described in the first embodiment above will be explained.

FIG. 22 is a partial cross-sectional view showing an example of a liquid crystal display device according to this embodiment. FIG. 22 illustrates a cross-section of a pixel or a sub-pixel unit. FIG. 22 is a cross-section vertical to a longitudinal direction of two sides (sidelines) of the frame pattern B1 of the black matrix BM.

A liquid crystal display device 39 includes the array substrate 16, the liquid crystal layer 17 and the counter substrate 5. The array substrate 16 and the counter substrate 5 face each other through the liquid crystal layer 17.

In the liquid crystal display device 39, the counter substrate 5 and the array substrate 16 face each other, and the liquid crystal layer 17 of vertical alignment is sandwiched between the counter substrate 5 and the array substrate 16. The alignment film 25 is formed above/on a top surface of the transparent resin layer 3 of the counter substrate 5. The alignment film 25 is in contact with the liquid crystal layer 17. The transparent substrate 2 faces the observer.

FIG. 22 illustrates liquid crystal molecules of vertically alignment. In FIG. 22, the transparent electrode 4, the pixel electrode 22 and the common electrode 21 are in the absence of an applied voltage. The liquid crystal layer 17 includes negative dielectric anisotropy liquid crystal molecules. In FIG. 22, the polarizing plate and the retardation plate are omitted because they are the same as usual ones.

Figure 23:
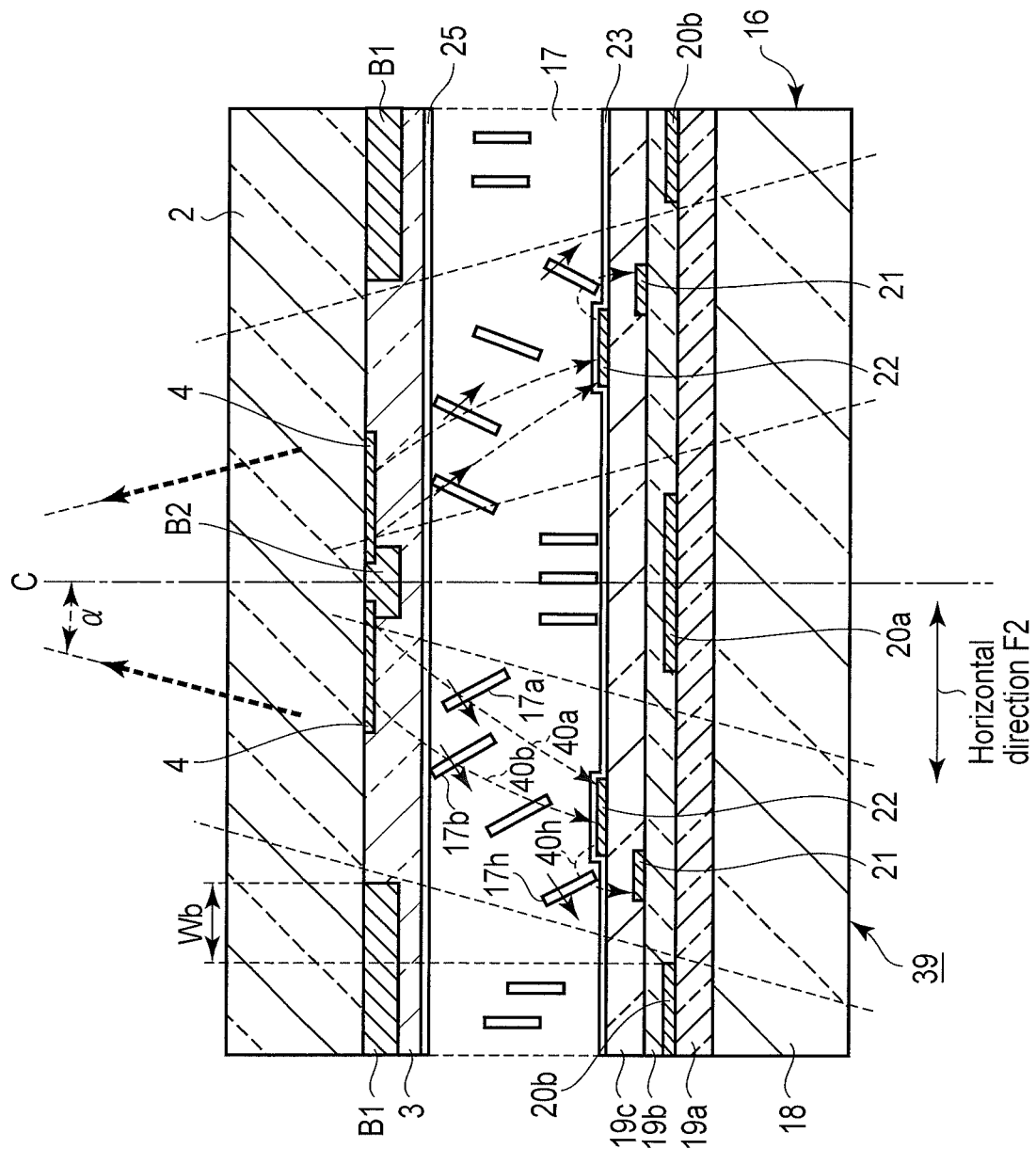
FIG. 23 is a partial cross-sectional view showing an example of the liquid crystal display device when a drive voltage is applied according to the sixth embodiment.

FIG. 23 is a partial cross-sectional view showing an example of states of liquid crystal molecules in a liquid crystal display device 39 upon applying a drive voltage.

In the liquid crystal display device 39, liquid crystal molecules incline by using the transparent electrode 4 and the common electrode 21 as a common potential (common) and applying voltage to the pixel electrode 22. Longitudinal directions of liquid crystal molecules 17a and 17b incline to arrow directions. The arrow directions are vertical to lines of electric force 40a and 40b. The liquid crystal molecule 17h is located in the vicinity of the pixel electrode 22 and the common electrode 21. The longitudinal direction of the liquid crystal molecule 17h inclines to a direction vertical to a line of electric force 40h. A width of the frame pattern B1 in the horizontal direction is wider than a width of the light-shielding pattern 20b. At a position in the horizontal direction F2 in a pixel or a sub-pixel, Wb is a width in which the frame pattern B1 protrudes from the light-shielding pattern 20b toward a central side. A light from an opening of this pixel or the sub-pixel is output with an inclination of a light transmission angle α based on inclinations of the liquid crystal molecules 17a, 17b and 17h, and a relationship between the frame pattern B1 and the central pattern B2 of the black matrix BM, and the light-shielding patterns 20a and 20b.

FIG. 24 is a cross-sectional view showing an example of a liquid crystal display device according to this embodiment. FIG. 24 is a cross-sectional view in a vertical direction.

The liquid crystal display device 39 further includes a back light unit 41 in addition to the constituents illustrated in FIG. 22 and FIG. 23. In the liquid crystal display device 39, the back light unit 41 is located on a back side of the array substrate 16.

The back light 41 includes a prism sheet 36, RGB individually emitting elements 42a and 42b such as LED, and a reflector 35.

A control section 43 synchronizes, for example, a red light emitter, a green light emitter and blue light emitter to an active element driving a ½ opening of a pixel or a sub-pixel when a liquid crystal drive is performed, whereby a three-dimensional image display is realized.

When two active elements are not provided to a pixel or a sub-pixel but one pixel or one sub-pixel is driven by one active element, a general two-dimensional image can be displayed by a field sequential (time-sharing) drive.

[Seventh Embodiment]

In this embodiment, a liquid crystal display device including the counter substrate 11 of FIG. 7 as described in the first embodiment above will be explained.

FIG. 25 is a partial cross-sectional view showing an example of a liquid crystal display device according to this embodiment. FIG. 25 illustrates a cross-section of a pixel or a sub-pixel unit. FIG. 25 is a cross-section vertical to the longitudinal direction of two sides (sidelines) of the frame pattern B1 of the black matrix BM.

A liquid crystal display device 44 includes the array substrate 16, the liquid crystal layer 17 and the counter substrate 11. The array substrate 16 and the counter substrate 11 face each other with the liquid crystal layer 17.

In the liquid crystal display device 44, the counter substrate 11 and the array substrate 16 face each other, and the liquid crystal layer 17 of a vertical alignment is sandwiched between the counter substrate 11 and the array substrate 16. The alignment film 25 is formed above/on a top surface of the transparent resin layer 3 of the counter substrate 11. The alignment film 25 formed above/on the counter substrate 5 is in contact with the liquid crystal layer 17. The transparent substrate 2 faces the observer.

In FIG. 25, an arrangement (arrangement in a planar view) of the frame pattern B1, the central pattern B2, the transparent electrode 4, the pixel electrode 22 and the common electrode 21 in the horizontal direction F2 is the same as that in the first embodiment.

In this embodiment, the transparent pattern 12 is formed between the color layer 7 and the central pattern B2. The transparent pattern 12 is partly overlapped with the transparent electrode 4 in the planar view.

FIG. 25 illustrates the liquid crystal display device 44 before application of a drive voltage, and longitudinal directions of liquid crystal molecules of the liquid crystal layer 17 are aligned vertically to each of the array substrate 16 and the counter substrate 11.

Figure 26:
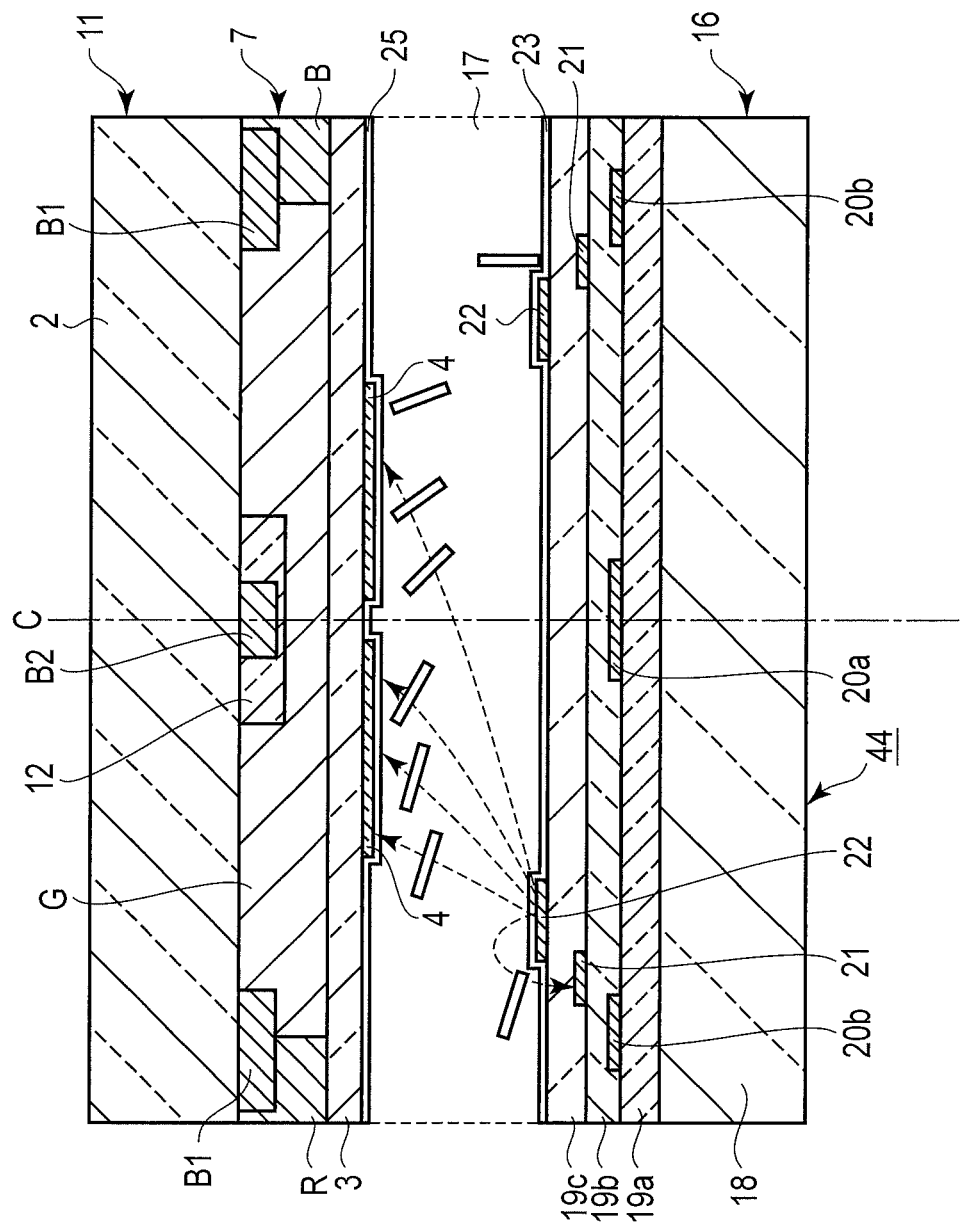
FIG. 26 is a partial cross-sectional view showing an example of a liquid crystal display device when a drive voltage is applied according to the seventh embodiment.

FIG. 26 is a partial cross-sectional view showing an example of a state of a liquid crystal in the liquid crystal display device 44 when a drive voltage is applied to the pixel electrode 22 on a left side.

In the liquid crystal display device 44, longitudinal directions of liquid crystal molecules incline to a direction vertical to a line of electric force. At this time, the transparent electrode 4 is, for example, in a ground voltage of a common potential. The pixel electrode 22 of the left side of the pixel or the sub-pixel in applying a drive voltage can incline liquid crystal molecules on an opposite side (right side) over a central axis C. Therefore, the pixel electrode 22 in applying the drive voltage inclines the liquid crystal molecules of the left side and the right side of the pixel or the sub-pixel. As a result, the liquid crystal display device 44 can obtain higher transmittance for the pixel or the sub-pixel, and can display a bright three-dimensional image.

When the liquid crystal display device 44 includes the transparent pattern 12, it can provide a brighter display.

The counter substrate 11 of the liquid crystal display device 44 is formed by forming the central pattern B2 of the black matrix BM, forming the transparent pattern 12 so as to cover the central pattern B2, and forming the color layer 7, the transparent resin layer 3 and the transparent electrode 4. The transparent pattern 12 is formed from an alkali-soluble, photosensitive acrylic resin in a known photography method.

[Eighth Embodiment]

In this embodiment, a method for producing the counter substrate 5 of FIG. 2 illustrated in the first embodiment above.

(Formation of Transparent Electrode 4)

According to the method for producing the counter substrate 5, first, a transparent conductive film, an ITO film (a thin film of the metal-oxide of indium.tin) is formed above/on a whole surface of one side of a transparent substrate 2 of non-alkali glass using a sputtering device. This ITO film is formed, for example, in a film thickness of 0.14 μm at a substrate temperature of room temperature using a sputtering device. Next, the resulting ITO film is formed into the stripe transparent electrode 4 with a line width of, for example, 20 μm according to a known photolithography method. ITO films formed at room temperature are necessary to anneal for increasing a transmittance. A heat-treatment for annealing may be carried out together with treatment for hardening a film in formation of a black matrix in a post-process.

(Formation of Black Matrix BM)

<Dispersion for Forming Black Matrix>

A carbon black dispersion is produced by adding 20 parts by weight of a carbon pigment, 8.3 parts by weight of a polymer dispersing agent, 1.0 part by weight of a copper phthalocyanine derivative, and 71 parts by weight of propylene glycol monomethyl ether acetate, and stirring them in a bead mill disperser.

<Photoresist for Forming Black Matrix>

As resist materials for forming a black matrix, for example, carbon black dispersion, a resin (solid content: 56.1% by weight), a monomer, an initiator, a solvent (propylene glycol monomethyl ether acetate or ethyl-3-ethoxypropionate), and a leveling agent are used. These materials are mixed and stirred in a composition ratio described below, and the mixture is used as a resist for forming a black matrix (a pigment concentration in solid matter: about 19%).

| | |
|---|---|
| Carbon black dispersion | 3.0 parts by weight |
| Resin | 1.4 parts by weight |
| Monomer | 0.3 part by weight |
| Initiator | 0.67 part by weight |
| Initiator | 0.17 part by weight |
| Propylene glycol monomethyl ether acetate | 15 parts by weight |
| Ethyl-3-ethoxypropionate | 5.0 parts by weight |
| Leveling agent | 1.5 parts by weight |

<Forming Conditions of Black Matrix BM>

When a frame pattern B1 and a central pattern B2 of the black matrix BM are formed, first, the photoresist is spin-coated on a transparent substrate 2 such as glass, which is dried, for example, at 100° C. for 3 minutes, to obtain a coating film having a film thickness of 1.4 μm formed above/on the surface of the transparent substrate 2. Next, light is emitted from a light source to the transparent substrate 2 through a photo mask for exposure having a predetermined pattern width (comparative to a picture line width of the black matrix BM) and an opening pattern. This light is emitted in a light amount of 200 mj/cm² using, for example, an ultra-high pressure mercury lamp. After that, a development of the photoirradiated substrate is performed using a 2.5% aqueous sodium carbonate solution, for example, over 60 seconds, the resulting substrate is washed with water, dried, and subjected to a heat-treatment at 230° C. for 60 minutes to fix patterns. The black matrix BM is formed above/on the transparent substrate 2 by the procedure described above. The frame pattern B1 has a picture line width of, for example, about 20 μm, and the central pattern B2 has a picture line width of, for example, about 8 μm. The pixel or the sub-pixel may have a "<"-shaped state in a planar view of the black matrix BM.

(Formation of Transparent Resin Layer 3)

A transparent resin layer 3 is formed using a coating liquid of an alkali-soluble, photosensitive acrylic resin so as to cover the black matrix BM and openings which are not light-shielded by the black matrix BM. The transparent resin layer 3 is formed so as to have a film thickness of, for example, about 2 μm after it is hardened. The formation of this transparent resin layer 3 forms a counter substrate 5 for liquid crystal display.

The counter substrate 5 of this embodiment can be applied to not only a mono-color display but also color liquid crystal display device such as a field sequential display device (a technique for performing color display without using color filters, which uses a LED light source with multiple colors as a back light, and uses a time-sharing drive).

As the coating liquid of photosensitive acrylic resin, a coating liquid of a transparent resin which is obtained, for example, by synthesizing an acrylic resin as described below, adding monomers and a light-initiator thereto, and subjecting the mixture, for example, to 0.5 μm filtration.

(Synthesis of Acrylic Resin)

In synthesis of an acrylic resin, first, 800 parts of cyclohexanone is added to a reaction vessel, the reaction vessel is heated while nitrogen gas is introduced therein, a mixture of monomers described below and an initiator for heat polymerization is added dropwise to the reaction vessel, and polymerization reaction is performed.

| | |
|---|---|
| Styrene | 55 parts |
| Methacrylic acid | 65 parts |
| Methyl methacrylate | 65 parts |
| Benzyl methacrylate | 60 parts |
| Initiator for heat polymerization | 15 parts |
| Chain-transfer agent | 3 parts |

After the mixture was added dropwise, the resulting mixture was thoroughly heated, and then 2.0 parts of the initiator for heat polymerization dissolved in 50 parts of cyclohexanone was added to the resulting mixture. The reaction is continued to obtain a solution of an acrylic resin.

To this resin solution is added cyclohexanone to obtain a resin solution (1) having a solid content of 30% by weight. The acrylic resin had a weight average molecular weight of about 20000.

Further, after a mixture having the following composition is uniformly mixed and stirred, the mixture is dispersed in a sand mill having glass beads with a diameter, for example, of 1 mm for a given time (2 hours), and the resulting mixture is filtered through a 0.5 μm filter to obtain a coating liquid of a transparent resin.

| | |
|---|---|
| Resin solution (1) | 100 parts by weight |
| Polyfunctional, polymerizable monomer, EO-modified bisphenol-A methacrylate | 20 parts |
| Light-initiator | 16 parts by weight |
| Cyclohexanone | 150 parts by weight |

The counter substrate 1 illustrated in FIG. 1 as described in the first embodiment above can be produced in a way in which a part of the production steps described in this embodiment is replaced, and a transparent electrode 4 is formed above/on a transparent resin layer 3. Also, a photo mask pattern used for formation of a black matrix BM is adjusted to design specifications of a frame pattern B1 and a central pattern B2.

In this embodiment, a structure in which the black matrix BM is formed above/on the transparent electrode 4 is explained, but the transparent electrode 4 may be formed above/on the black matrix BM.

[Ninth Embodiment]

In this embodiment, a method for producing the counter substrate 6 of FIG. 4 described in the first embodiment above will be explained.

(Formation of Black Matrix BM)

For example, a black matrix BM including a frame pattern B1 and a central pattern B2 is formed above/on one surface of a transparent substrate 2 such as a non-alkali glass using the photoresist for forming a black matrix described above in the same pattern.

(Formation of Color Layer 7 (Color Pixel))

<Dispersion for Forming Color Layer>

As organic pigments which are dispersed in a color layer 7, the following materials are used.

Red Pigment

C. I. Pigment Red 254

C. I. Pigment Red 177

Green Pigment

C. I. Pigment Green 58

C. I. Pigment Green 150

Blue Pigment

C. I. Pigment Blue 15

C. I. Pigment Violet 23

Using the pigments described above, a red, green or blue dispersion is produced.

| Red pigment dispersion | |
|---|---|
| Red pigment: C. I. Pigment Red 254 | 18 parts by weight |
| Red pigment: C. I. Pigment Red 177 | 2 parts by weight |
| Acrylic varnish (solid content: 20% by weight) | 108 parts by weight |

After a mixture having the composition described above is uniformly stirred, it is dispersed in a sand mill using glass beads for a given time (for example, 5 hours), and is filter through a filter (for example, 5 μm filter) to obtain a red pigment dispersion.

| Green Pigment Dispersion | |
|---|---|
| C. I. Pigment Green 58 | 16 parts by weight |
| C. I. Pigment Green Yellow 150 | 8 parts by weight |
| Acrylic varnish (solid content: 20% by weight) | 102 parts by weight |

A green pigment dispersion is produced from a mixture having the composition described above in the same manner as in the production of the red pigment dispersion.

| Blue Pigment Dispersion | |
|---|---|
| C. I. Pigment Blue 15 | 50 parts by weight |
| C. I. Pigment Violet 23 | 2 parts by weight |
| Dispersing agent | 6 parts by weight |
| Acrylic varnish (solid content: 20% by weight) | 200 parts by weight |

A blue pigment dispersion is produced from a mixture having the composition described above in the same manner as in the production of the red pigment dispersion.

<Color Resist for Forming Color Pixel>

| Color Resist for Forming Red Pixel | |
|---|---|
| Red dispersion | 150 parts by weight |
| Trimethylolpropane triacrylate | 13 parts by weight |
| Light initiator | 4 parts by weight |
| Sensitize | 2 parts by weight |
| Solvent: cyclohexanone | 257 parts by weight |

After a mixture having the composition described above is mixed and stirred to obtain a uniform mixture, it is filtered through a 5 μm filter to obtain a color resist for forming red pixel.

| Color Resist for Forming Green Pixel | |
|---|---|
| Green dispersion | 126 parts by weight |
| Trimethylolpropane triacrylate | 14 parts by weight |
| Light initiator | 4 parts by weight |
| Sensitize | 2 parts by weight |
| Cyclohexanone | 257 parts by weight |

After a mixture having the composition described above is mixed and stirred to obtain a uniform mixture, it is filtered through a 5 μm filter to obtain a color resist for forming green pixel.

Color Resist for Forming Blue Pixel

A color resist for forming blue pixel is produced using the following composition in the same manner as in the production of the color resist for forming red pixel.

| | |
|---|---|
| Blue dispersion | 258 parts by weight |
| Trimethylolpropane triacrylate | 19 parts by weight |
| Light initiator | 4 parts by weight |
| Sensitize | 2 parts by weight |
| Cyclohexanone | 214 parts by weight |

<Color Layer Formation>

A color layer 7 is formed using the color resists for forming color pixel obtained in the methods described above. Various conditions in this formation of the color layer 7 are one example, and other conditions may be employed.

In the formation of the color layer 7, first, a substrate is spin-coated with the color resist for forming red pixel in a finished film thickness of 1.8 μm. After it is dried at 90° C. for 5 minutes, 300 mJ/cm² of light of a high-pressure mercury lamp is irradiated through a photo mask for forming a color layer, which is developed in an alkaline developer to form a stripe-shaped red filter R (red pixel). After that, the red filter R is baked at 230° C. for 30 minutes. A part in which the black matrix BM is overlapped with the color layer 7 has a length of, for example, 6.0 μm. The pixel or the sub-pixel has a rectangular shape as illustrated in FIG. 12.

The resist for forming green pixel is also spin-coated in a finished film thickness of 1.8 μm in the same manner as above. After the resulting product is dried at 90° C. for 5 minutes, exposure through a photo mask and development are performed so that a pattern is formed at a position adjacent to the red filter R, whereby a green filter G (green pixel) is formed.

A resist for forming blue pixel having a finished film thickness of 1.8 μm is obtained in the same manner as in the production of the red or green case. After that, the green filter G is hardened at 230° C. for 30 minutes.

(Formation of Transparent Resin Layer 3)

Using the coating liquid of the transparent acrylic resin obtained in the eighth embodiment described above, a transparent resin layer 3 having a film thickness of 2 μm after the film-hardening treatment is formed so that the color layer 7 including three color filters of the red filter R, the green filter G and the blue filter B is covered with the transparent resin layer. The transparent resin layer 3 is hardened at 230° C. for 30 minutes.

(Formation of Transparent Electrode 4)

In a formation of a transparent electrode 4 of ITO, using a sputtering device, an ITO film (a thin film of metal oxide of indium tin) is formed in a film thickness of 0.14 μm at room temperature so that the transparent resin layer 3 is covered with this film.

ITO is formed into a transparent electrode 4 having a width of 20 μm, using a known photolithography method. After the formation of a pattern, the transparent electrode 4 is subjected to a heat-treatment at 230° C. for 30 minutes for annealing the ITO film.

The counter substrate 10 is formed by the steps described above.

In this embodiment, the transparent electrode 4 is formed above/on the transparent resin layer 3. The transparent electrode 4, however, may be formed directly on the transparent substrate 2, or may be formed between the color layer 7 and the transparent resin layer 3.

[Tenth Embodiment]

In this embodiment, a method for producing the counter substrate 12 of FIG. 8 described in the first embodiment above.

(Formation of Black Matrix BM)

Using a photoresist for forming a black matrix, a black matrix BM including a frame pattern B1 and a central pattern B2 is formed in the same steps as in the eighth embodiment.

(Formation of Color Layer 7)

Using the color resists for forming color layer of red, green or blue, a color layer 7 including a red filter R, a green filter G and a blue filter B is produced in the same steps as in the ninth embodiment described above. As a photo mask, a gray tone mask in which a transmittance at a midsection of a pixel or a sub-pixel is reduced is used for forming a concavity 13 at a center of each pixel or sub-pixel. The concavity 13 having a depth of 0.5 μm is formed, for example, at a center of the pixel or the sub-pixel along the central pattern B2 by a photolithography method using the gray tone mask. When an inclination (shoulder) of the concavity 13 is utilized for a liquid crystal alignment, it is appropriate that the depth of the concavity 13 is within a range of 0.3 μm to 1.5 μm.

(Formation of Transparent Resin Layer 4)

Using the coating liquid of transparent acrylic resin obtained in the eighth embodiment described above, a transparent resin layer 3 is formed so that the whole of the color layer 7 including the red filter R, the green filter G and the blue filter B is covered with the transparent resin layer. The transparent resin layer 3 is hardened at 230° C. for 30 minutes.

(Formation of Transparent Electrode 4)

In the formation of a transparent electrode 4, an ITO film (a thin film of metal oxide of indium.tin) having a film thickness of 0.14 μm is formed at room temperature using a sputtering device so that the transparent resin layer 3 is covered with the ITO film.

The ITO is formed into a stripe pattern having a width of 20 μm using a known photolithography method. After the formation of the pattern, the stripe transparent electrode 4 is subjected to a heat-treatment at 230° C. for 30 minutes for annealing of the ITO film. A counter substrate 12 is formed by the steps described above.

In this embodiment, the structure in which the transparent electrode 4 is formed above/on the transparent resin layer 3 is explained. The transparent electrode 4, however, may be formed directly on one surface of the transparent substrate 2, or may be formed between the color layer 7 and the transparent resin layer 3.

[Eleventh Embodiment]

In this embodiment, transparent resins and organic pigments which are applicable to the color layer 7 in each embodiment described above will be explained.

(Transparent Resin)

A photosensitive color composition, which is used in the formation of various light-shielding layers such as the black matrix BM and the light-shielding patterns 20a and 20b, and the color layer 7, includes polyfunctional monomers, photosensitive resins or non-photosensitive resins, polymerization initiators, solvents, and the like, in addition to a pigment dispersion. Hereinafter, highly transparent organic resins which can be used in this embodiment including the photosensitive resin and non-photosensitive resin are collectively referred to as a transparent resin.

The transparent resin includes thermoplastic resins, thermosetting resins or photosensitive resins. As thermoplastic resin, for example, a butyral resin, styrene-maleic acid copolymer, a chlorinated polyethylene, a chlorinated polypropylene, a polyvinyl chloride, a vinyl chloride-vinyl acetate copolymer, a polyvinyl acetate, a polyurethane resin, a polyester resin, an acrylic resin, an alkyd resin, a polystyrene resin, a polyamide resin, a rubber resin, a cyclized rubber resin, celluloses, a polybutadiene, a polyethylene, a polypropylene, a polyimide resin, and the like are used. As thermosetting resin, for example, an epoxy resin, a benzoguanamine resin, a rosin-modified maleic acid resin, a rosin-modified fumaric acid resin, a melamine resin, a urea resin, a phenol resin, and the like are used. As thermosetting resin, for example, a product obtained by reacting a melamine resin with a compound including an isocyanate group may be used.

(Alkali-Soluble Resin)

For forming the light-shielding layer which is the forming material for the black matrix BM used in this embodiment, and the color layer 7, it is preferable to use a photosensitive resin composition capable of forming a pattern by photolithography. The transparent resin is preferably a resin having an alkali-solubility. As the alkali-soluble resin, resins including a carboxyl group or hydroxyl group can be used. For example, as the alkali-soluble resin, an epoxyacrylate resin, a novolak resin, a polyvinyl phenol resin, an acrylic resin, a carboxyl group-containing epoxy resin, a carboxyl group-containing urethane resin, and the like can be used. As the alkali-soluble resin, the epoxyacrylate resin, the novolak resin and the acrylic resin are preferable, and the epoxyacrylate resin and the novolak resin are particularly preferable.

(Acrylic Resin)

As the transparent resin, for example, the following acrylic resins are applicable.

As the acrylic resin, polymers obtained from the following monomers are used. Examples of the monomer may include (meth)acrylic acid; alkyl(meth)acrylates such as methyl (meth)acrylate, ethyl(meth)acrylate, propyl(meth)acrylate, butyl(meth)acrylate, t-butyl(meth)acrylate, benzyl(meth) acrylate, and lauryl(meth)acrylate; hydroxyl group-containing (meth)acrylates such as hydroxyethyl(meth)acrylate and hydroxypropyl(meth)acrylate; ether group-containing (meth)acrylate such as ethoxyethyl(meth)acrylate and glydicyl(meth)acrylate; and alicyclic(meth)acrylates such as cyclohexyl(meth)acrylate, isobornyl(meth)acrylate, and dicyclopentenyl(meth)acrylate.

The monomers described above may be used alone or as a mixture of two or more kinds thereof. In addition, copolymer of the monomer with a compound copolymerizable with the monomer such as styrene, cyclohexyl maleimide or phenyl maleimide may be used as the acrylic resin.

For example, a photosensitive resin may be obtained by reacting a copolymer obtained by copolymerization with a carboxylic acid having an ethylenically unsaturated group such as (meth)acrylic acid with a compound having an epoxy group and unsaturated double bond such as glydicyl methacrylate. A photosensitive resin may also be obtained by adding a carboxylic acid-containing compound such as (meth)acrylic acid to a polymer of an epoxy group-containing (meth)acrylate such as glydicyl methacrylate or a copolymer of a polymer of an epoxy group-containing (meth)acrylate such as glydicyl methacrylate with another (meth)acrylate.

For example, a photosensitive resin may be obtained by reacting a hydroxyl group-containing polymer of a monomer such as hydroxyethyl methacrylate with a compound having an isocyanate group and an ethylenically unsaturated group such as methacryloyloxyethyl isocyanate.

As described above, a resin having a carboxyl group can be also obtained by reacting a copolymer of hydroxyethyl methacrylate having multiple hydroxyl groups with a polybasic acid anhydride to introduce a carboxyl group into the copolymer. The method for producing a resin having a carboxyl group is not limited to this method.

The acid anhydride used in the reaction described above may include, for example, malonic anhydride, succinic anhydride, maleic anhydride, itaconic anhydride, phthalic anhydride, tetrahydrophthalic anhydride, hexahydrophthalic anhydride, methyl tetrahydrophthalic anhydride, trimellitic anhydride, and the like.

The acrylic resin has an acid value in solid of, preferably, 20 to 180 mgKOH/g. When the acid value is less than 20 mgKOH/g, a development speed of the photosensitive resin composition is too slow and the time required for development becomes long, thus resulting in the tendency of reduced productivity. When the acid value in solid is more than 180 mgKOH/g, the development speed is too high, thus resulting in tendency of occurrence of defects such as pattern peeling or chipped patterns after the development.

Also, when the acrylic resin is photosensitive, the acrylic resin has a double bond equivalent of, preferably 100 or more, more preferably 100 to 2000, most preferably 100 to 1000.

When the double bond equivalent is more than 2000, sufficient photocurability may not be sometimes obtained.

(Photopolymerizable Monomer)

As the photopolymerizable monomer, for example, various acrylic acid esters and methacrylic acid esters such as 2-hydroxyethyl(meth)acrylate, 2-hydroxypropyl(meth)acrylate, cyclohexl(meth)acrylate, polyethylene glycol di(meth)acrylate, pentaerythritol tri(meth)acrylate, trimethylolpropane tri(meth)acrylate, dipentaerythritol hexa(meth)acrylate, tricyclodecanyl(meth)acrylate, melamine(meth)acrylate, and epoxy(meth)acrylate; (meth)acrylic acid, styrene, vinyl acetate, (meth)acrylamide, N-hydroxymethyl(meth)acrylamide, and acrylonitrile may be used.

It is preferable to use, for example, a polyfunctional urethane acrylate having a (meth)acryloyl group obtained by reacting a (meth)acrylate having a hydroxyl group with a polyfunctional isocyanate as the photopolymerizable monomer. The combination of the (meth)acrylate having a hydroxyl group and the polyfunctional isocyanate is optional, and is not particularly limited. As the photopolymerizable monomer, the polyfunctional urethane acrylate may be used alone or as a mixture of two or more kinds.

(Photopolymerization Initiator)

As the photopolymerization initiator, for example, the following compounds may be used, that is, acetophenone compounds such as 4-phenoxydichloroacetophenone, 4-t-butyl dichloroacetophenone, diethoxyacetophenone, 1-(4-isopropylphenyl)-2-hydroxy-2-methylpropane-1-one, 1-hydroxycyclohexl phenyl ketone, and 2-benzyl-2-dimethylamino-1-(4-morpholinophenyl)-butane-1-one; benzoin compounds such as benzoin, benzoin methyl ether, benzoin ethyl ether, benzoin isopropyl ether, and benzyl dimethyl ketal; benzophenone compounds such as benzophenone, benzoylbenzoid acid, methyl benzoylbenzoate, 4-phenyl benzophenone, hydroxybenzophenone, acrylated benzophenone, and 4-benzoyl-4'-methyldiphenyl sulfide; thioxanthone compounds such as thioxanthone, 2-chlorothioxanthone, 2-methyl thioxanthone, isopropyl thioxanthone, and 2,4-diisopropyl thioxanthone; triazine compounds such as 2,4,6-trichloro-s-triazine, 2-phenyl-4,6-bis(trichloromethyl)-s-triazine, 2-(p-methoxyphenyl)-4,6-bis(trichloromethyl)-s-triazine, 2-(p-tolyl)-4,6-bis(trichloromethyl)-s-triazine, 2-pipenyl-4,6-bis(trichloromethyl)-s-triazine, 2,4-bis(trichloromethyl)-6-styryl-s-triazine, 2-(naphto-1-yl)-4,6-bis(trichloromethyl)-s-triazine, 2-(4-methoxynaphto-1-yl)-4,6-bis(trichloromethyl)-s-triazine, 2,4-trichloromethyl(piperonyl)-6-triazine, and 2,4-trichloromethyl(4'-methoxystyryl)-6-triazine; oxime ester compounds such as 1,2-octanedione, 1-[4-(phenylthio)-, 2-(O-benzoyloxime)], and O-(acetyl)-N-(1-phenyl-2-oxo-2-(4'-methoxynaphthl)ethylidene)hydroxylamine; phosphine compounds such as bis(2,4,6-trimethylbenzoyl)phenylphosphine oxide, and 2,4,6-trimethylbenzoyldiphenylphosphine oxide; quinone compounds such as 9,10-phenanthrenequinone, camphorquinone, and ethyl anthraquinone; borate compounds; carbazole compounds; imidazole compounds; titanocene compounds, and the like. It is effective to use the oxime derivatives (oxime compounds) in order to increase sensitivity. These compounds may be used alone or as a mixture of two or more kinds thereof.

(Sensitizer)

With respect to a sensitizer, for example, it is preferable to use the photopolymerizable initiator together with the sensitizer. As the sensitizer, for example, compounds such as a-acyloxy ester, acylphosphine oxide, methyl phenyl glyoxylate, benzyl-9,10-phenanthrenequinone, camphorquinone, ethyl anthraquinone, 4,4'-diethylisophthalone, 3,3',4,4'-tetra(t-butylperoxycarbonyl)benzophenone, and 4,4'-diethylaminobenzophenone may be used.

The sensitizer may be included in an amount of 0.1 part by mass from 60 parts by mass based on 100 parts by mass of the photopolymerizable initiator.

(Ethylenically Unsaturated Compound)

It is preferable to use the photopolymerizable initiator together with an ethylenically unsaturated compound. The ethylenically unsaturated compound refers to a compound having one or more ethylenically unsaturated bonds in its molecule. Compounds having two or more ethylenically unsaturated bonds in its molecule are further preferable as the photopolymerizable initiator, in terms of the polymerizability and cross-linkability, and because a difference in developer solubility between the exposed part and the non-exposed part can be increased. (Meth)acrylate compounds having an unsaturated bond derived from a (meth)acryloyloxy group are particularly preferable as the photopolymerizable initiator.

As the compound having one or more ethylenically unsaturated bonds in its molecule, for example, unsaturated carboxylic acids such as (meth)acrylic acid, crotonic acid, isocrotonic acid, maleic acid, itaconic acid and citraconic acid, and alkyl esters thereof; (meth)acrylonitrile; (meth)acrylamide; styrene, and the like are used. As the compound having two or more ethylenically unsaturated bonds in its molecule, for example, esters of an unsaturated carboxylic acid and a polyhydroxy compound, (meth)acryloyloxy group-containing phosphates, urethane(meth)acrylates of a hydroxy(meth)acrylate compound and a polyisocyanate compound, and epoxy(meth)acrylates of (meth)acrylic acid or hydroxy (meth)acrylate compound and a polyepoxy compound are used.

When a phase difference layer is formed in a liquid crystal, the photopolymerizable initiator, the sensitizer and the ethylenically unsaturated compounds may be added to a composition including the polymerizable liquid crystal compound.

(Polyfunctional Thiol)

The photosensitive color composition may include a polyfunctional thiol which acts as a chain-transfer agent. Any compound having two or more thiol group may be used as the polyfunctional thiol, and, for example, hexane dithiol, decane dithiol, 1,4-butanediolbisthiopropionate, 1,4-butanediolbisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trismercaptopropionic acid tris(2-hydroxyethyl)isocyanurate, 1,4-dimethyl mercaptobenzene, 2,4,6-trimercapto-s-triazine, 2-(N,N-dibutylamino)-4,6-dimercaptos-triazine, and the like may be used.

These polyfunctional thiols may be used alone or as a mixture of two or more kinds thereof. The polyfunctional thiol may be used in an amount of, preferably 0.2 to 150 parts by mass, based on 100 parts by mass of the pigment, more preferably 0.2 to 100 parts by mass in the photosensitive color composition.

(Solvent)

In order to realize uniform coating on a substrate, a solvent such as water or an organic solvent is added to the photosensitive color composition. When the composition used in this embodiment is used for a color layer of a color filter, the solvent has also a function capable of uniformly dispersing a pigment. As the solvent, for example, cyclohexanone, ethyl cellosolve acetate, butyl cellosolve acetate, 1-methoxy-2-propyl acetate, diethyleneglycol dimethyl ether, ethyl benzene, ethyleneglycol diethyl ether, xylene, ethyl cellosolve, methyl-n-amyl ketone, propyleneglycol monomethyl ether, toluene, methyl ethyl ketone, ethyl acetate, methanol, ethanol, isopropyl alcohol, butanol, isobutyl ketone, petroleum solvents, and the like may be used. The solvents may be used alone or as a mixture. The solvent may be contained in an amount of 800 parts by mass to 4000 parts by mass, preferably 1000 parts by mass to 2500 parts by mass, based on 100 parts by mass of the pigment, in the color composition.
(Organic Pigment)

As the red pigment, for example, C. I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, 279, and the like may be used.

As a yellow pigment, for example, C. I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, 214, and the like may be used.

As the blue pigment, for example, C. I. Pigment Blue 15, 15:1, 15:2, 15:3, 15:4, 15:6, 16, 22, 60, 64, 80 and the like may be used. Of these, C. I. Pigment Blue 15:6 is preferable.

As a violet pigment, for example, C. I. Pigment Violet 1, 19, 23, 27, 29, 30, 32, 37, 40, 42, 50 and the like may be used. Of these, C. I. Pigment Violet 23 is preferable.

As the green pigment, for example, C. I. Pigment Green 1, 2, 4, 7, 8, 10, 13, 14, 15, 17, 18, 19, 26, 36, 45, 48, 50, 51, 54, 55, 58, and the like may be used. Of these, C. I. Pigment Green 58 is preferable.

Hereinafter, description of the pigment kind of C. I. Pigment may be abbreviated as PB (Pigment Blue), PV (Pigment Violet), PR (Pigment Red), PY (Pigment Yellow), PG (Pigment Green), and the like.
(Color Material of Black Matrix BM)

The light-shielding color material included in the black matrix BM is a color material showing a light-shielding function because of its absorption within a range of visible light wavelength. In this embodiment, as the light-shielding color material, for example, organic pigments, inorganic pigments, dyes, and the like are used. As the inorganic pigment, for example, carbon black, titanium oxide, and the like are used. As the dye, for example, azo dyes, anthraquinone dyes, phthalocyanine dyes, quinoneimine dyes, quinoline dyes, nitro dyes, carbonyl dyes, methine dyes are used. As the organic pigment, the organic pigments described above are employed. The light-shielding components may be used alone, or as a mixture of two or more kinds in any proportion. High volume resistance may be caused by resin-coating of the surface of the color material. On the contrary, slight conductivity is provided to a base material of a resin by decreasing a content of the color material to realize low volume resistance. The volume resistance of the light-shielding material is, however, within a range of about $1\times10^8$ to $1\times10^{15}$ Ω·cm, which is not up to a level influencing on a resistance of a transparent conductive film. For example, in a structure in which a transparent conductive film such as an ITO film is laminated on the black matrix BM, the conductivity of the black matrix BM does not largely influence on the transparent conductive film. A relative dielectric constant of the light-shielding layer may be controlled within a range of about 3 to 11 in terms of a selection and a content of color materials. The relative dielectric constants of the light-shielding layer, the first transparent resin layer and the color layer can be controlled according to the design conditions of a liquid crystal display device or driving conditions of liquid crystals.

[Twelfth Embodiment]

In this embodiment, the gist of each embodiment described above will be explained.

In a counter substrate according to a first aspect, multiple openings are formed by the black matrix BM formed above/on the transparent substrate 2. In the black matrix BM, the two sides facing each other in the frame pattern B1 are parallel to the central pattern B2 formed at the center of the opening in a planar view. The stripe transparent electrodes 4 are parallel and adjacent to the two sides facing each other in the frame pattern B1 in a planar view.

In a counter substrate according to a second aspect, the stripe transparent electrodes 4 are parallel to the central pattern B2 in a planar view, and are adjacent thereto at both sides of the central pattern B2.

The term "adjacent" herein includes a case in which there is an overlapped part of, for example, about 0 to 6 μm between the transparent electrode 4 and the central pattern B2, and also a case in which there is a slight space of, for example, about 0 to 6 μm.

In the first and second aspects described above, the transparent resin layer 3 may be formed so that the transparent resin layer 3 cover the black matrix BM and the openings (light-transmitting regions) corresponding to the multiple pixels or sub-pixels. When the counter substrate is used for a color display, the counter substrate includes the color layer 7 including the color filters such as the red filter R, the green filter G and the blue filter B corresponding to the pixel or the sub-pixel, between the black matrix BM and the transparent resin layer 3. A red sub-pixel corresponding to the red filter R, a green sub-pixel corresponding to the green filter G and a blue sub-pixel corresponding to the blue filter B may be expressed as a unit pixel or unit. In the first and second aspects, the transparent electrode 4 can be formed at any position in the cross-sectional view. The transparent electrode 4 may be formed before the black matrix BM is formed, or the transparent electrode 4 may be formed above/on the black matrix BM, the transparent resin layer 3 or the color layer 7.

In a third aspect, the liquid crystal display device includes the array substrate 16, the liquid crystal layer 17 and the counter substrate. The array substrate 16 and the counter substrate face each other with the liquid crystal layer 17.

The array substrate 16 includes the stripe-shaped or comb-teeth-shaped pixel electrode 22, and the active element 24 electrically connected to the pixel electrode 22 for each opening.

The counter substrate includes the stripe transparent electrode 4 for each opening. The transparent electrode 4 and the pixel electrode 22 of the array substrate 16 are parallel. The transparent electrode 4 shifts from the pixel electrode 22 in a planar view.

The pixel electrodes 22 of the array substrate 16 are located at positions of axial symmetry from the center of the opening in the planar view. The transparent electrodes 4 of the counter substrate 8 are located at positions of axial symmetry from the center of the opening in the planar view.

In a liquid crystal display device according to a fourth aspect, the array substrate 16 includes the stripe-shaped or comb-teeth-shaped pixel electrodes 22, the active element 24 electrically connected to the pixel electrodes 22, and the stripe-shaped or comb-teeth-shaped common electrodes 21 for each opening.

In the black matrix BM, the planar view shape of the multiple openings is any of the rectangle, the parallelogram, and the "<"-shaped bending polygon. The black matrix BM includes the frame pattern B1 separating the openings. The black matrix BM includes the central pattern B2 which is parallel to the two sides of the frame pattern B1 parallel to each other and is located at the center of the opening.

The pixel electrodes 22 of the array substrate 16 are parallel to the central pattern B2 of the counter substrate in the planar view.

The liquid crystal display device according to the third or fourth aspect described above may include the two or four active elements 24 for each opening. Difference voltages may be applied to the two or four active elements 24, respectively. The liquid crystal display device further includes a control section driving the liquid crystals by applying the voltages to the active elements 24 based on the different video signal.

The liquid crystal display device according to the third or fourth aspect may further include an edge-light type light-guiding section for its back surface. The edge-light type light-guiding section may include solid light-emitting element arrays on the both ends. In this case, a control section of the liquid crystal display device may synchronize emissions of the solid light-emitting element arrays at the both ends with applying video signal to the two or four active elements 24.

The liquid crystal display device according to the third or fourth aspect may further include one or more light-controlling elements having a light-refraction function. The light-controlling element may be provided above/on a surface or back surface of the liquid crystal display device. The light-controlling element may include, for example, a flexible lens array, a lens sheet (hereinafter may be referred to as the lenticular lens) 32, the prism sheet 36, and the like. In order to reduce a weight of the liquid crystal display device including the light-controlling element, the lens sheet 32 or the prism sheet 36 can be selected and used. One or more lens sheets 32 and/or one or more prism sheets 36 can be provided above/on the back surface or the surface of the liquid crystal display device.

In order to reduce moire caused between an arrangement of multiple openings (pixels or sub-pixels) of the liquid crystal display device and a geometric arrangement of the lens sheets 32 or prism sheets 36 (arrangement of lenses or arrangement of prisms), an angle θ may be provided between the optical axis of the lens sheet 32 or prism sheet 36 and the arrangement of the openings. The optical axis herein refers to a direction vertical to the arrangement of lenses or lines of prisms in a planar view. The angle θ provided for reducing the moire, can be selected from a range of 15 degrees to 60 degrees, such as 30 degrees or 45 degrees. When there is a 15-degree to 30-degree difference between the optical axis of the lens sheet 32 or prism sheet 36 and the optical axis of the polarizing plate or the retardation plate, the interference with the polarizing plate or with the retardation plate can be avoided.

In each aspect described above, the stripe transparent electrode 4 of the counter substrate is adjacent to the two sides of the frame pattern B1 or the central pattern B2 of the black matrix BM of the counter substrate. The stripe transparent electrode 4 of the counter substrate shifts the pixel electrode 21 of the array substrate 16. The liquid crystal layer 17 is sandwiched between the counter substrate and the array substrate 16. Thus a shifted positional relation of the electrodes can realize oblique electric field driving for the vertical alignment liquid crystal.

Each aspect described above can provide thin and light three-dimensional image liquid crystal display devices with a high resolution.

The liquid crystal display device including the counter substrate according to the first or second aspect, and the liquid crystal display device according to the third or fourth aspect can display the three-dimensional image for one observer (binocular type) without using glasses, a parallax barrier or a flexible lens array.

In addition, when one or more lens sheets 32 or prism sheets 36 are applied to the liquid crystal display device, the three-dimensional image with high image quality can be displayed for multiple observers (multiocular type).

In the liquid crystal display device including the counter substrate according to the first or second aspect, and the liquid crystal display device according to the third or fourth aspect, when the transparent patterns 9 and 12 are formed on the periphery of the black matrix BM, dynamic display emphasizing brightness can be performed.

In the liquid crystal display device including the counter substrate according to the first or second aspect, and the liquid crystal display device according to the third or fourth aspect, when the light-reflective metal thin film is used as the light-shielding pattern 20b of the array substrate 16, the transflective liquid crystal display device can be provided.

As described above, the first to fourth aspects can provide novel liquid crystal display devices having multiple display functions.

Each embodiment can be carried out in various changes within the scope of the present invention.

What is claimed is:
1. A liquid crystal display device, comprising:
an array substrate comprising an active element, a counter substrate, and a liquid crystal layer, the array substrate and the counter substrate facing each other with the liquid crystal layer, wherein
the array substrate comprises a stripe-shaped or comb-teeth-shaped pixel electrode which is electrically connected to the active element for each pixel or sub-pixel located in a matrix state;
the counter substrate comprises
a black matrix dividing a plane surface of a transparent substrate into pixels units or sub-pixel units to form a light-shielded area and multiple openings above the plane surface, and
multiple stripe transparent electrodes formed into the pixel unit or the sub-pixel unit above the plane surface;
the black matrix comprises a frame pattern including two sides facing each other in parallel in the pixel unit or the sub-pixel unit, and a linear central pattern which is in parallel to the two sides of the frame pattern and formed at a midsection of the pixel unit or the sub-pixel unit;
the multiple transparent electrodes are each parallel to the two sides of the frame pattern, the central pattern and the pixel electrode, and are located symmetrically to the central pattern in a cross-section vertical to the longitudinal direction of the two sides of the frame pattern, and are shifted from the pixel electrode in a horizontal direction of the cross-section; and
liquid crystal molecules included in the liquid crystal layer have a negative dielectric anisotropy, and an initial alignment of a longitudinal direction of the liquid crystal molecule is vertical; and
the pixel electrode is shifted from the central pattern in a horizontal direction of the cross-section.
2. The liquid crystal display device according to claim 1, wherein the array substrate further comprises a comb-teeth-shaped or stripe-shaped common electrode.

3. The liquid crystal display device according to claim 2,
wherein a longitudinal direction of the pixel electrode and a longitudinal direction of the common electrode are in parallel,
the pixel electrode and the common electrode are partly overlapped with each other through an insulating layer in a vertical direction of the plane surface, and
a part of the common electrode protrudes from the pixel electrode to a central side of the pixel or the sub-pixel in the horizontal direction of the cross-section.

4. The liquid crystal display device according to the claim 1,
wherein a distance between a cross-section center of the transparent electrode and a cross-section center of the frame pattern is shorter than a distance between the cross-section center of the transparent electrode and a cross-section center of the central pattern in the cross-section, and
the multiple transparent electrodes and the two sides of the frame pattern are adjacent at a position in the horizontal direction of the cross-section.

5. The liquid crystal display device according to claim 1,
wherein a distance between a cross-section center of the multiple transparent electrodes and a cross-section center of the two sides of the frame pattern is longer than a distance between the cross-section center of the multiple transparent electrodes and a cross-section center of the central pattern in the cross-section, and
the multiple transparent electrodes and the central pattern are adjacent at a position in the horizontal direction of the cross-section.

6. The liquid crystal display device according to claim 1,
wherein the pixel electrode has at least one flaw line on a surface of a liquid crystal layer side.

7. The liquid crystal display device according to claim 6,
wherein a longitudinal direction of the flaw line is parallel or vertical to a longitudinal direction of the pixel electrode.

8. The liquid crystal display device according to claim 1,
wherein the array substrate further comprises a light-shielding pattern, and
the light-shielding pattern is wider in a width than the frame pattern in the horizontal direction of the cross-section, and is overlapped with the frame pattern at a position in a vertical direction of the plane surface.

9. The liquid crystal display device according to claim 8,
wherein the light-shielding pattern is formed from a light-reflective metal thin film.

10. The liquid crystal display device according to claim 1,
wherein the counter substrate further comprises a color layer for which any one of red, green and blue is allocated to the pixel or the sub-pixel.

11. The liquid crystal display device according to claim 1,
wherein the pixel or the sub-pixel has multiple regions comprising different transmittances in the horizontal direction.

12. The liquid crystal display device according to claim 1,
wherein the liquid crystal layer has negative dielectric anisotropy and includes liquid crystals of initial vertical alignments.

13. The liquid crystal display device according to claim 1,
wherein the active element is an oxide semiconductor thin-film transistor using a complex metal-oxide which is transparent in a visible range as a channel material.

14. The liquid crystal display device according to claim 1, further comprising:
two or four pixel electrodes comprising the pixel electrode allocated to the pixel or the sub-pixel; and
two or four active elements comprising the active element allocated to the pixel or the sub-pixel,
wherein the two or four active elements apply voltages to the two or four pixel electrodes based on different video signals to drive liquid crystals included in the liquid crystal layer.

15. The liquid crystal display device according to claim 1, further comprising:
a light-controlling element having a light-refraction function for at least one of a back surface of the array substrate and a surface of the counter substrate.

16. The liquid crystal display device according to claim 15,
wherein the light-controlling element includes at least one of one or more lens sheets and one or more prism sheets.

17. The liquid crystal display device according to claim 15,
wherein the light-controlling element refractiles a light in a vertical direction to a longitudinal direction of the pixel electrode.

18. The liquid crystal display device according to claim 15,
wherein an optical axis of the light-controlling element has an angle θ to an alignment direction of the pixel or the sub-pixel in the plane surface for decreasing moire.

19. The liquid crystal display device according to claim 1, further comprising:
an edge-light type light-guiding section comprising a light-emitting element array for the back surface of the array substrate; and
a light-emitting section synchronizes emitting of the light-emitting element array with applying to the active element based on a video signal.

20. The liquid crystal display device according to claim 1,
wherein the counter substrate further comprises a color layer for which any one of red, green and blue is allocated to the pixel or the sub-pixel.

21. A liquid crystal display device, comprising:
an array substrate comprising an active element, a counter substrate, and a liquid crystal layer, the array substrate and the counter substrate facing each other with the liquid crystal layer, wherein
the array substrate comprises a stripe-shaped or comb-teeth-shaped pixel electrode which is electrically connected to the active element for each pixel or sub-pixel located in a matrix state;
the array substrate further comprises a comb-teeth-shaped or stripe-shaped common electrode;
the counter substrate comprises
a black matrix dividing a plane surface of a transparent substrate into pixels units or sub-pixel units to form a light-shielded area and multiple openings above the plane surface, and
multiple stripe transparent electrodes formed into the pixel unit or the sub-pixel unit above the plane surface;
the black matrix comprises a frame pattern including two sides facing each other in parallel in the pixel unit or the sub-pixel unit, and a linear central pattern which is in parallel to the two sides of the frame pattern and formed at a midsection of the pixel unit or the sub-pixel unit;
the multiple transparent electrodes are each parallel to the two sides of the frame pattern, the central pattern and the pixel electrode, and are located symmetrically to the central pattern in a cross-section vertical to the longitudinal direction of the two sides of the frame pattern, and are shifted from the pixel electrode in a horizontal direction of the cross-section;

a longitudinal direction of the pixel electrode and a longitudinal direction of the common electrode are in parallel;

the pixel electrode and the common electrode are partly overlapped with each other through an insulating layer in a vertical direction of the plane surface; and a part of the common electrode protrudes from the pixel electrode to a central side of the pixel or the sub-pixel in the horizontal direction of the cross-section.

* * * * *